United States Patent
Kang

(10) Patent No.: US 12,229,595 B2
(45) Date of Patent: *Feb. 18, 2025

(54) METHOD AND SYSTEM FOR ALLOCATING ON-CHIP MEMORY OF NEURAL PROCESSING UNIT

(71) Applicant: REBELLIONS INC., Seongnam-si (KR)

(72) Inventor: Minhoo Kang, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,214

(22) Filed: May 23, 2024

(65) Prior Publication Data
US 2024/0320044 A1 Sep. 26, 2024

Related U.S. Application Data

(63) Continuation of application No. 18/389,676, filed on Dec. 19, 2023, now Pat. No. 12,026,552.

(30) Foreign Application Priority Data

Mar. 22, 2023 (KR) .................. 10-2023-0037428

(51) Int. Cl.
*G06F 9/46* (2006.01)
*G06F 9/50* (2006.01)

(52) U.S. Cl.
CPC .......... *G06F 9/5016* (2013.01); *G06F 9/5022* (2013.01); *G06F 9/5044* (2013.01)

(58) Field of Classification Search
None
See application file for complete search history.

(56) References Cited

U.S. PATENT DOCUMENTS

| | | | |
|---|---|---|---|
| 11,474,938 B2 * | 10/2022 | Shveidel | G06F 3/061 |
| 2006/0236065 A1 * | 10/2006 | Lee | G06F 12/023 711/171 |
| 2020/0348990 A1 * | 11/2020 | Katzenberger | G06F 9/5022 |

* cited by examiner

*Primary Examiner* — Bing Zhao
(74) *Attorney, Agent, or Firm* — BROADVIEW IP LAW, PC

(57) ABSTRACT

A method for allocating on-chip memory of a neural processing unit is performed by one or more processors, and includes deallocating an allocated chunk in an on-chip memory area, which is finished with the use of the memory, and converting it into a cached chunk, receiving an on-chip memory allocation request for specific data, determining whether there is a cached chunk of one or more cached chunks that is allocable for the specific data, based on a comparison between a size of the specific data and the size of the one or more cached chunks, and based on a result of determining whether there is the cached chunk that is allocable for the specific data, allocating the specific data to a specific cached chunk of the one or more cached chunks, or allocating the specific data to at least a portion of the free chunk.

17 Claims, 19 Drawing Sheets

: ALLOCATED CHUNK 1610

: FIRST TYPE CACHE CHUNK (EXACT MATCH) 1620

: SECOND TYPE CACHE CHUNK (n% MATCH) 1630

: FREE CHUNK 1640

METHOD AND SYSTEM FOR ALLOCATING ON-CHIP MEMORY OF NEURAL PROCESSING UNIT

CROSS-REFERENCE TO RELATED APPLICATION

This application is a continuation of U.S. application Ser. No. 18/389,676, filed on Dec. 19, 2023, which claims priority under 35 U.S.C. § 119 to Korean Patent Application No. 10-2023-0037428, filed in the Korean Intellectual Property Office on Mar. 22, 2023, the entire contents of which are hereby incorporated by reference.

TECHNICAL FIELD

The present disclosure relates to a method and system for allocating on-chip memory of a neural processing unit, and more specifically, to a method and system for holding deallocated memory chunks as cached chunks and preferentially allocating data of the same or similar size to the cached chunks.

BACKGROUND

According to a related memory allocation system, when a program requests memory allocation, the system finds and allocates a free memory block of a size that meets the request. In addition, the system deallocates the memory block once its use is finished with. If such allocation and deallocation are performed repeatedly, memory fragmentation may occur, in which the available memory area is divided into very small segments.

If the memory fragmentation occurs, the probability that there is no single block of free memory large enough to meet the program's memory allocation request may increase. Therefore, since the memory fragmentation may have a negative impact on the performance and efficiency of the system, it is necessary to prevent it in advance. In particular, on-chip memory is generally used when efficient and fast memory access is required, and often has a smaller capacity than off-chip memory, which may further emphasize the importance of preventing memory fragmentation.

SUMMARY

In order to address one or more problems (e.g., the problems described above and/or other problems not explicitly described herein), the present disclosure provides a method for, a non-transitory computer-readable recording medium storing instructions for, and an apparatus (system) for allocating on-chip memory of a neural processing unit.

The present disclosure may be implemented in a variety of ways, including a method, an apparatus (system), or a non-transitory computer-readable recording medium storing instructions.

A method for allocating on-chip memory of a neural processing unit may be performed by one or more processors and may include, in an on-chip memory area including a plurality of chunks classified as one of an allocated chunk, a cached chunk, or a free chunk, deallocating the allocated chunk finished with use of the memory and converting the deallocated chunk into the cached chunk, receiving an on-chip memory allocation request for specific data, determining whether there is a cached chunk of one or more cached chunks that is allocable for the specific data, based on a comparison between a size of the specific data and the size of the one or more cached chunks, and based on a result of determining whether there is the cached chunk that is allocable for the specific data, allocating the specific data to a specific cached chunk of the one or more cached chunks, or allocating the specific data to at least a portion of the free chunk.

The determining may include determining whether there is a cached chunk, which has the same size as the size of the specific data, of the one or more cached chunks, and the allocating may include, allocating, based on determining that a size of the specific cached chunk of the one or more cached chunks is the same as the size of the specific data, the specific data to the specific cached chunk, or allocating, based on determining that there is no cached chunk matching the size of the specific data, the specific data to at least a portion of the free chunk.

The determining may include determining, among the one or more cached chunks having a predefined range associated with each of the one or more cached chunks, whether there is a cached chunk that has the predefined range into which the size of the specific data falls, and the allocating may include, allocating, based on determining that the size of the specific data falls into the predefined range associated with a specific cached chunk, the specific data to the specific cached chunk, or allocating, based on determining that the size of the specific data does not fall into the predefined range associated with each of the one or more cached chunks, the specific data to at least a portion of the free chunk.

An upper limit of the predefined range associated with each of the one or more cached chunks may be a size of each of the one or more cached chunks, a lower limit of the predefined range associated with each of the one or more cached chunks may be value of multiplying the size of each of the one or more cached chunks by a predefined ratio, and the predefined ratio may be a real number greater than 0 and less than 1.

The predefined ratio may be determined based on a memory format of data input or output to or from the on-chip memory, and a data layout of an artificial intelligence application executed or compiled by the one or more processors.

The method may further include converting a specific cached chunk of the one or more cached chunks into a free chunk, if a number of times that the specific cached chunk is not allocated with any data as a result of size comparison with the data is equal to or greater than a first predefined number of times.

The allocating may include, if there is no cached chunk allocable for the specific data and if there is no free chunk allocable for the specific data, converting at least a portion of the cached chunks into a free chunk.

The one or more cached chunks may be classified as either a first type cached chunk or a second type cached chunk, and the first type cached chunk is a type of cached chunk such that the data to be allocated is allocated to the cached chunk if the size of the data to be allocated is the same as the size of the data of the cached chunk, and the second type cached chunk is a type of cached chunk such that the data to be allocated is allocated to the cached chunk if the size of the data to be allocated falls into a predefined range associated with the cached chunk. The method may be performed while the one or more processors are executing or compiling an artificial intelligence application, and the converting into the cached chunk may include, if the allocated chunk finished with the use of the memory is a chunk allocated for weight data of the artificial intelligence application, deallocating the allocated chunk finished with the use of the memory and converting the deallocated chunk into the first type cached chunk, or if the allocated chunk finished with the use of the memory is a chunk allocated for input data or output data to or from the artificial intelligence application, deallocating the allocated chunk finished with the use of the memory and converting the deallocated chunk into the second type cached chunk.

The one or more cached chunks may be classified as either a first level cached chunk or a second level cached chunk, and the determining may include determining whether there is a cached chunk, which has the same size as the size of the specific data, of the first level cached chunks, and determining, based on determining that there is no cached chunk, which has the same size as the size of the specific data, of the first level cached chunks, among the second level cached chunks having a predefined range associated with each of the second level cached chunks, whether there is a cached chunk that has the predefined range to which the size of the specific data falls into.

The method may further include converting a cached chunk of the one or more cached chunks into a free chunk, if a number of times that the cached chunk is not allocated with any data as a result of size comparison with the data is equal to or greater than a second predefined number of times, and converting a cached chunk of the second level cached chunks into a free chunk, if a number of times that the cached chunk is not allocated with any data as a result of size comparison with the data is equal to or greater than a third predefined number of times.

A neural processing system may include a neural processing unit that executes neural network calculations for an artificial intelligence application, an on-chip memory that is located on the same chip as the neural processing unit, and one or more processors that manage memory allocation of the on-chip memory, in which the on-chip memory may include a plurality of chunks, and each of the plurality of chunks of the on-chip memory may be classified as one of: an allocated chunk indicating that the chunk is in a state of being allocated for any data; a cached chunk indicating that the chunk was allocated for any data, then deallocated, and is in a holding state before being converted into a free chunk; or a free chunk indicating that the chunk is not allocated for any data and is a chunk other than the cached chunk.

The one or more processors may deallocate the allocated chunk finished with use of the memory and convert the deallocated chunk into a cached chunk.

The one or more processors may receive an on-chip memory allocation request for specific data, determine, based on a comparison between a size of the specific data and one or more cached chunks, whether there is a cached chunk, which is allocable for the specific data, of the one or more cached chunks, and according to the determination result, allocate the specific data to a specific cached chunk of the one or more cached chunks, or allocate the specific data to at least a portion of the free chunk.

The one or more processors may determine whether there is a cached chunk, which has the same size as the size of the specific data, of the one or more cached chunks, and allocate, based on determining that a size of the specific cached chunk of the one or more cached chunks is the same as the size of the specific data, the specific data to the specific cached chunk, or allocate, based on determining that there is no cached chunk matching the size of the specific data, the specific data to at least a portion of the free chunk.

The one or more processors may determine, among the one or more cached chunks having a predefined range associated with each of the one or more cached chunks, whether there is a cached chunk that has the predefined range into which the size of the specific data falls, and allocate, based on determining that the size of the specific data falls into the predefined range associated with a specific cached chunk, the specific data to the specific cached chunk, or allocate, based on determining that the size of the specific data does not fall into the predefined range associated with each of the one or more cached chunks, the specific data to at least a portion of the free chunk.

An upper limit of the predefined range associated with each of the one or more cached chunks may be a size of each of the one or more cached chunks, a lower limit of the predefined range associated with each of the one or more cached chunks may be a value of multiplying the size of each of the one or more cached chunks by a predefined ratio, and the predefined ratio may be a real number greater than 0 and less than 1.

The predefined ratio may be determined based on a memory format of data input or output to or from the on-chip memory, and a data layout included in an artificial intelligence application executed or compiled by the one or more processors.

The one or more processors may convert a cached chunk of the cached chunks into a free chunk, if a number of times that the cached chunk is not allocated with any data as a result of size comparison with the data is equal to or greater than a first predefined number of times.

The one or more processors may convert at least a portion of the cached chunks into a free chunk, if there is no cached chunk allocable for the specific data and if there is no free chunk allocable for the specific data.

The cached chunks may be classified as either a first type cached chunk or a second type cached chunk, and the first type cached chunk may be a type of cached chunk such that the data to be allocated is allocated to the cached chunk if the size of the data to be allocated matches the size of the data of the cached chunk, and the second type cached chunk may be a type of cached chunk such that the data to be allocated is allocated to the cached chunk if the size of the data to be allocated falls into a predefined range associated with the cached chunk.

The one or more processors may, if an allocated chunk of the allocated chunks that is finished with the use of the memory is a chunk allocated for weight data of the artificial intelligence application, deallocate the allocated chunk finished with the use of the memory and convert the deallocated chunk into the first type cached chunk, or if the allocated chunk finished with the use of the memory is a chunk allocated for input data or output data to or from the artificial intelligence application, deallocate the allocated chunk finished with the use of the memory and convert the deallocated chunk into the second type cached chunk.

The cached chunk may be classified as either a first level cached chunk or a second level cached chunk, and the one or more processors may determine whether there is a cached chunk, which has the same size as the size of the specific data, of the first level cached chunks, and determine, based on determining that there is no cached chunk of the first level cached chunks that has the same size as the size of the specific data, among the second level cached chunks having a predefined range associated with each of the second level cached chunks, whether there is a cached chunk that has the predefined range into which the size of the specific data falls.

The one or more processors may convert a cached chunk of the first level cached chunks into a second level cached chunk, if a number of times that the cached chunk is not allocated with any data as a result of size comparison with the data is equal to or greater than a second predefined number of times, and convert a cached chunk of the second level cached chunks into a free chunk, if a number of times that the cache chunk is not allocated with any data as a result of size comparison with the data is equal to or greater than a third predefined number of times.

According to some examples of the present disclosure, by holding the deallocated memory chunks as cached chunks and allocating the data of the same/similar size to the cached chunks preferentially, memory fragmentation can be prevented.

According to some examples of the present disclosure, by efficiently using the on-chip memory to prevent memory fragmentation, the operation latency and power consumption of the neural processing unit can be minimized.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
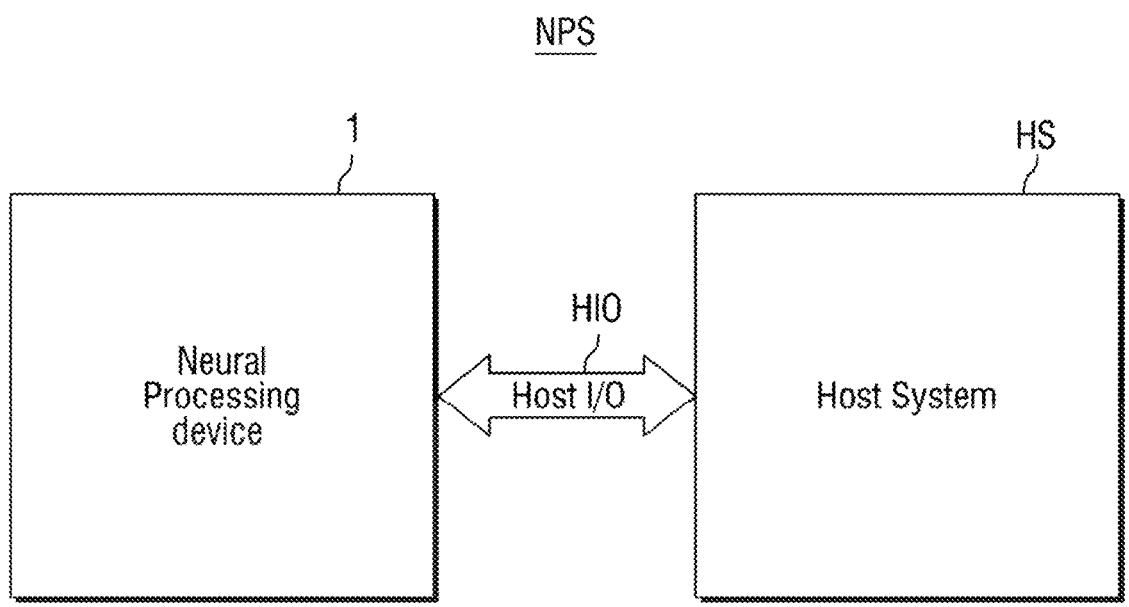
FIG. 1 is a block diagram provided to explain a neural processing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Accordingly, the terms used in this disclosure should be defined based on the meaning of the term and the overall content of the present disclosure, rather than simply the name of the term.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as circuit and circuitry may refer to circuits in hardware, but may also refer to circuits in software. The "processor" should be interpreted broadly to encompass a general-purpose processor, a central processing unit (CPU), a microprocessor, a digital signal processor (DSP), a neural processing unit (NPU), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In the present disclosure, "each of a plurality of A" may refer to each of all components included in the plurality of A, or may refer to each of some of the components included in a plurality of A.

Terms such as first, second, A, B and so on used in this specification and claims may be used in describing a variety of elements, but these elements should not be limited to the expression. The expressions are used only for the purpose of distinguishing one element from another. In addition, terms such as "first," "second," and so on as used in each drawing are only used for the purpose of distinguishing one element from another element in that drawing, and the elements should not be limited by these terms. For example, the first component and the second component described in the same drawing may be the same as or different from each other. As another example, first components depicted in different drawings may be the same or different from each other.

FIG. 1 is a block diagram provided to explain a neural processing system.

Referring to FIG. 1, a neural processing system (NPS) according to some examples of the present disclosure may include a first neural processing device 1, a host system (HS), and a host interface (HIO).

The first neural processing device 1 may be a device that performs operations using an artificial neural network. The first neural processing device 1 may be a device specialized for performing a deep learning computation work, for example. However, aspects are not limited to the above.

The first neural processing device 1 may be a processing device other than a neural processing device. That is, the first neural processing device 1 may be a graphics processing unit (GPU), a central processing unit (CPU), or other types of processing devices. Hereinafter, for convenience of description, the first neural processing device 1 will be explained by referring to a neural processing device.

The host system (HS) may be a system that instructs the first neural processing device 1 to perform a computation work and retrieve the result of the computation work. Compared to the first neural processing device 1, the host system (HS) may be a system that is not specialized for the deep learning computation works. However, aspects are not limited to the above.

The host system (HS) may manage memory allocation of the on-chip memory included in the first neural processing device 1. For example, the host system (HS) (e.g., at least one processor of the host system) may manage memory allocation of the on-chip memory in the process of compiling an artificial intelligence application. In this case, memory allocation information may be included in the compilation result, and operation by the first neural processing device 1 may be performed using the compilation result.

The host interface (HIO) may transmit the data and control signals between the first neural processing device 1 and the host system (HS). For example, the host interface (HIO) may transmit commands and data from the host system (HS) to the first neural processing device 1, and the first neural processing device 1 may perform the computation work accordingly. Upon completing the computation work, the first neural processing device 1 may transmit the result to the host system (HS) through an interrupt request. For example, the host interface HIO may be PCI Express (PCIe), but is not limited thereto.

Figure 2:
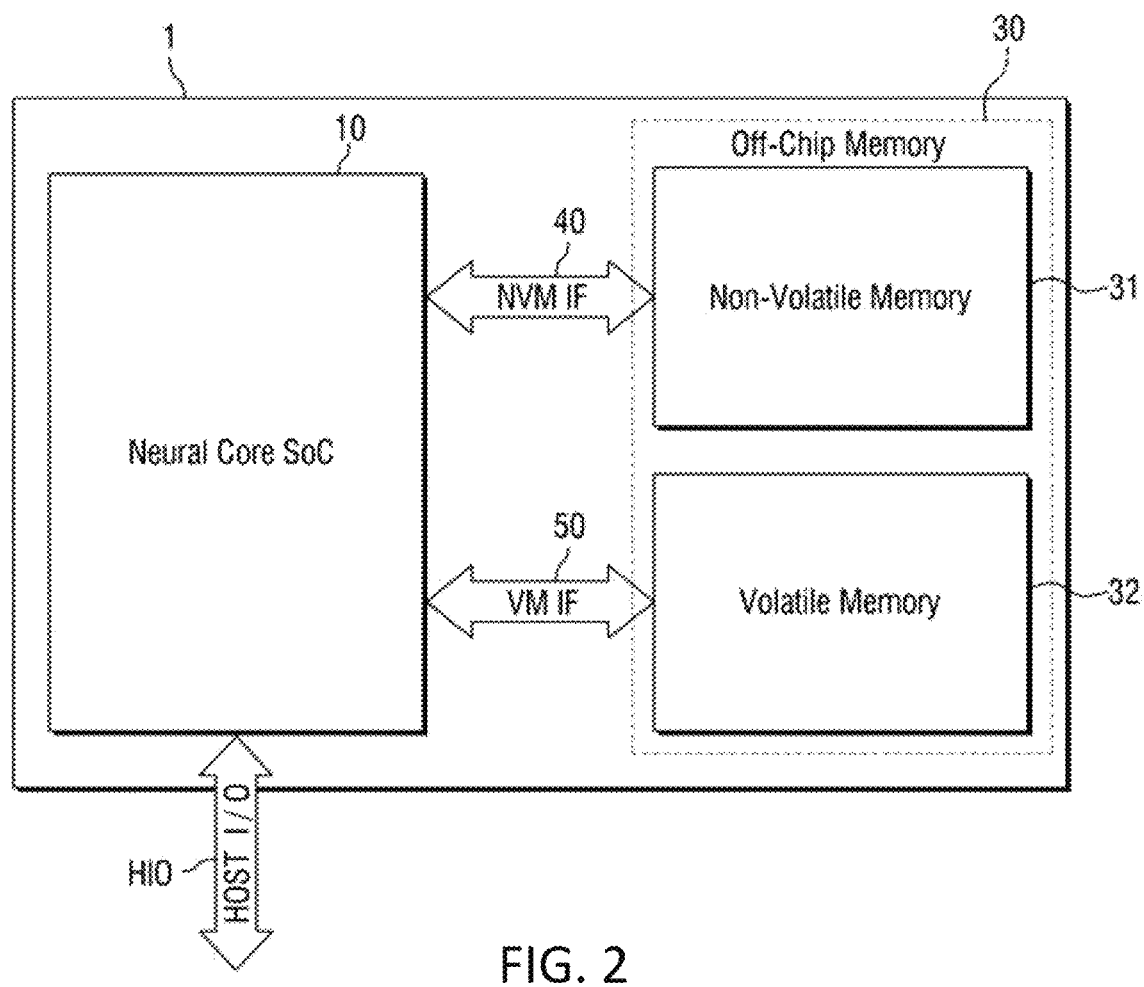
FIG. 2 is a block diagram provided to explain the neural processing device of FIG. 1 in detail.

FIG. 2 is a block diagram provided to explain the neural processing device of FIG. 1 in detail.

Referring to FIG. 2, the first neural processing device 1 may include a neural core SoC 10, an off-chip memory 30, a non-volatile memory interface 40, and a volatile memory interface 50.

The neural core SoC 10 may be a System on Chip device. The neural core SoC 10 may be an artificial intelligence computing unit and may be an accelerator. The neural core SoC 10 may be any one of a graphics processing unit (GPU), a field programmable gate array (FPGA), and an application-specific integrated circuit (ASIC), for example. However, aspects are not limited to the above.

The neural core SoC 10 may exchange data with other external computing units through a separate external interface. In addition, the neural core SoC 10 may be connected to a non-volatile memory 31 and a volatile memory 32 through the non-volatile memory interface 40 and the volatile memory interface 50, respectively.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVE-PROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, or 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, the non-volatile memory interface 40 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, the volatile memory interface 50 may be at least one of Single Data Rate (SDR), Double Data Rate (DDR), Quad Data Rate (QDR), eXtreme Data Rate (XDR), and Octal Data Rate. However, aspects are not limited to the above.

Figure 3:
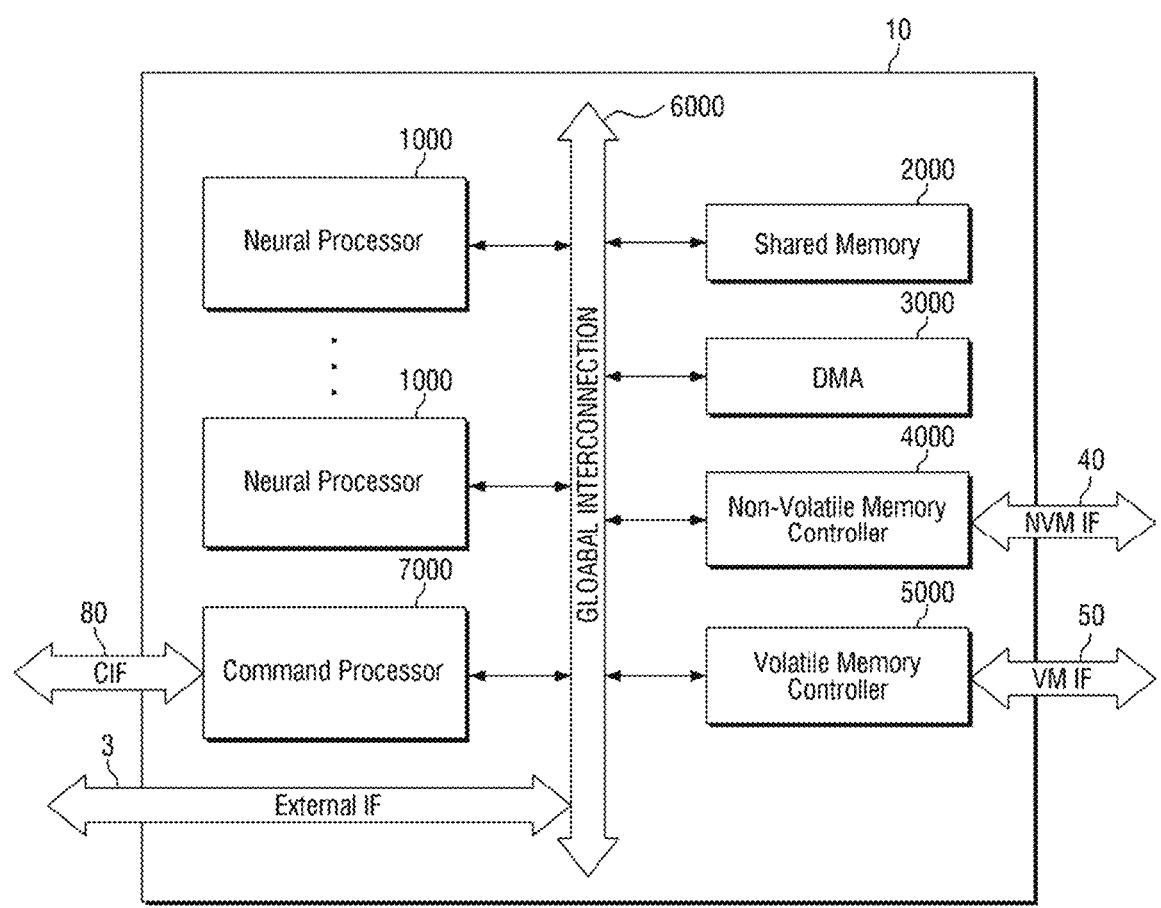
FIG. 3 is a block diagram provided to explain the neural core SoC of FIG. 2 in detail.

FIG. 3 is a block diagram provided to explain the neural core SoC of FIG. 2 in detail.

Referring to FIGS. 2 and 3, the neural core SoC 10 may include at least one neural processor 1000, a shared memory 2000, a Direct Memory Access (DMA) 3000, a non-volatile memory controller 4000, a volatile memory controller 5000, a command processor 7000, and a global interconnection 6000.

The neural processor 1000 may be a processing unit that directly performs computation works. If there are a plurality of neural processors 1000, the computation works may be allocated to each of the neural processors 1000. Each of the neural processors 1000 may be connected to each other through the global interconnection 6000.

The shared memory 2000 may be a memory shared by several neural processors 1000. The shared memory 2000 may store data of each neural processor 1000. In addition, the shared memory 2000 may receive data from the off-chip memory 30, temporarily store the data, and transmit the data to each neural processor 1000. Conversely, the shared memory 2000 may receive data from the neural processor 1000, temporarily store the data, and transmit the data to the off-chip memory 30 of FIG. 2. The shared memory 2000 may be an on-chip memory that is the target of the method for allocating on-chip memory of the present disclosure.

The shared memory 2000 may require a relatively fast memory. Accordingly, the shared memory 2000 may include SRAM, for example. However, aspects are not limited to the above. That is, the shared memory 2000 may include DRAM.

The shared memory 2000 may be a memory corresponding to an SoC level, that is, to level 2 (L2). Accordingly, the shared memory 2000 may be defined as the L2 shared memory.

The DMA 3000 may directly control the movement of data without the need for the CPU (e.g., 20 in FIG. 5) or the neural processor 1000 to control input and output of data. Accordingly, the DMA 3000 may control the movement of data between memories to minimize the number of interrupts of the CPU (e.g., 20 in FIG. 5) or the neural processor 1000.

The DMA 3000 may control the movement of data between the shared memory 2000 and the off-chip memory 30. The non-volatile memory controller 4000 and the volatile memory controller 5000 may perform the movement of data through the authority of the DMA 3000.

The non-volatile memory controller 4000 may control read or write work for the non-volatile memory 31. The non-volatile memory controller 4000 may control the non-volatile memory 31 through the first non-volatile memory interface 40.

The volatile memory controller 5000 may control the read or write work for the volatile memory 32. In addition, the volatile memory controller 5000 may perform a refresh work for the volatile memory 32. The volatile memory controller 5000 may control the volatile memory 32 through the first volatile memory interface 50.

The command processor 7000 may be connected to the control interface 80. The command processor 7000 may receive a control signal from the CPU (e.g., 20 in FIG. 5) through the control interface 80. The command processor 7000 may generate a task through the control signal received from the CPU (e.g., 20 in FIG. 5) and transmit the generated task to each neural processor 1000. In addition, the command processor 7000 may receive a task completion report from each neural processor 1000. If the shared memory 2000 is a memory that is the target of the method for allocating on-chip memory of the present disclosure, the command processor 7000 may use the method for allocating on-chip memory of the present disclosure to manage memory allocation of the shared memory 2000.

The global interconnection 6000 connects at least one neural processor 1000, the shared memory 2000, the DMA 3000, the non-volatile memory controller 4000, the command processor 7000, and the volatile memory controller 5000 to one another. In addition, the external interface 3 may also be connected to the global interconnection 6000. The global interconnection 6000 may be a path through which data moves between at least one neural processor 1000, the shared memory 2000, the DMA 3000, the non-volatile memory controller 4000, the volatile memory controller 5000, the command processor 7000, and the external interface 3.

The global interconnection 6000 may transmit not only the data, but also control signals and signals for synchronization. In the neural processing device according to some examples of the disclosure, each neural processor 1000 may directly transmit and receive the synchronization signal.

Accordingly, latency due to transmission of the synchronization signal generated by the command processor 7000 may be minimized.

That is, if there are a plurality of neural processors 1000, there may be a dependency of individual works in which the work of one neural processor 1000 must be completed before the next neural processor 1000 may start a new work. The end and start of these individual works may be confirmed through synchronization signals, but according to the existing technology, the command processor 7000 or the host, that is, the CPU 20 is in full charge of receiving the synchronization signal and instructing the start of a new work.

However, if the number of neural processors 1000 increases and the dependency of the works is designed more complexly, the number of synchronization signals will increase exponentially, and the latency according to each synchronization signal may significantly reduce the efficiency of the works.

Therefore, in the neural processing device according to some examples of the disclosure, instead of the command processor 7000, each neural processor 1000 may directly transmit part of the synchronization signals to the other neural processors 1000 according to the dependency of the work. In this case, compared to the way of managing by the command processor 7000, multiple neural processors 1000 may perform synchronization works in parallel, thereby minimizing latency due to synchronization.

In addition, the command processor 7000 also performs work scheduling of the neural processors 1000 according to the work dependency, and the overhead of such scheduling may increase significantly as the number of neural processors 1000 increases. Accordingly, in the neural processing device according to some examples of the disclosure, the scheduling work is partially performed by the individual neural processor 1000, which may reduce the scheduling burden and thus improve the performance of the device.

Figure 4:
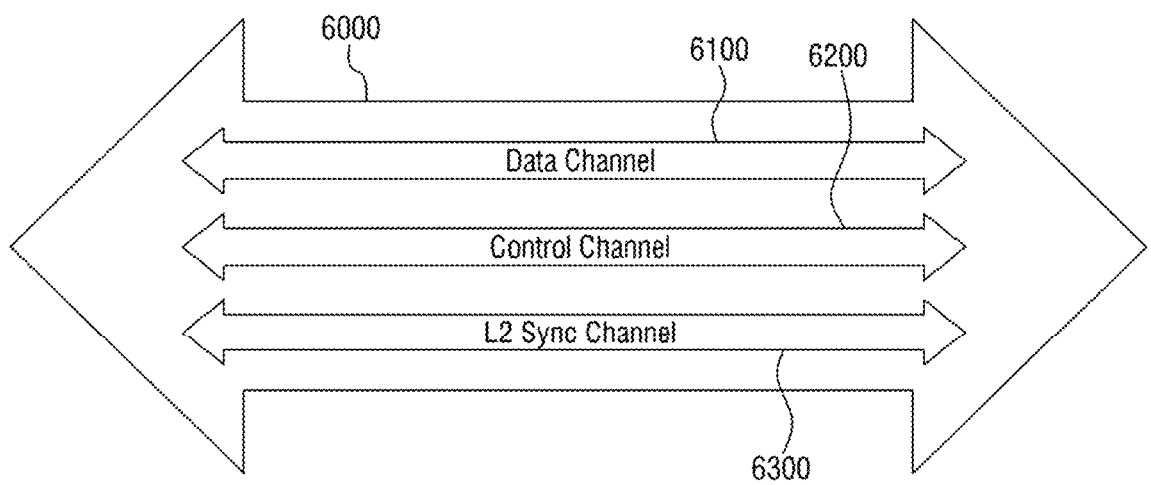
FIG. 4 is a structural diagram provided to explain the global interconnection of FIG. 3 in detail.

FIG. 4 is a structural diagram provided to explain the global interconnection of FIG. 3 in detail.

Referring to FIG. 4, the global interconnection 6000 may include a data channel 6100, a control channel 6200, and an L2 sync channel 6300.

The data channel 6100 may be a private channel for transmitting data. Through the data channel 6100, at least one neural processor 1000, the shared memory 2000, the DMA 3000, the non-volatile memory controller 4000, the volatile memory controller 5000, and the external interface 3 may exchange data with each other.

The control channel 6200 may be a private channel for transmitting control signals. Through the control channel 6200, at least one neural processor 1000, the shared memory 2000, the DMA 3000, the non-volatile memory controller 4000, the volatile memory controller 5000, the command processor 7000, and the external interface 3 may exchange control signals with each other. In particular, the command processor 7000 may transmit various control signals to each of the neural processors 1000.

The L2 sync channel 6300 may be a private channel for transmitting synchronization signals. Through the L2 sync channel 6300, at least one neural processor 1000, the shared memory 2000, the DMA 3000, the non-volatile memory controller 4000, the volatile memory controller 5000, the command processor 7000, and the external interface 3 may exchange the synchronization signals with each other.

The L2 sync channel 6300 may be set as a private channel inside the global interconnection 6000 so as to allow fast transmission of the synchronization signals without overlapping with other channels. Accordingly, the neural processing device may smoothly perform synchronization using the existing global interconnection 6000 without requiring new wiring work.

Figure 5:
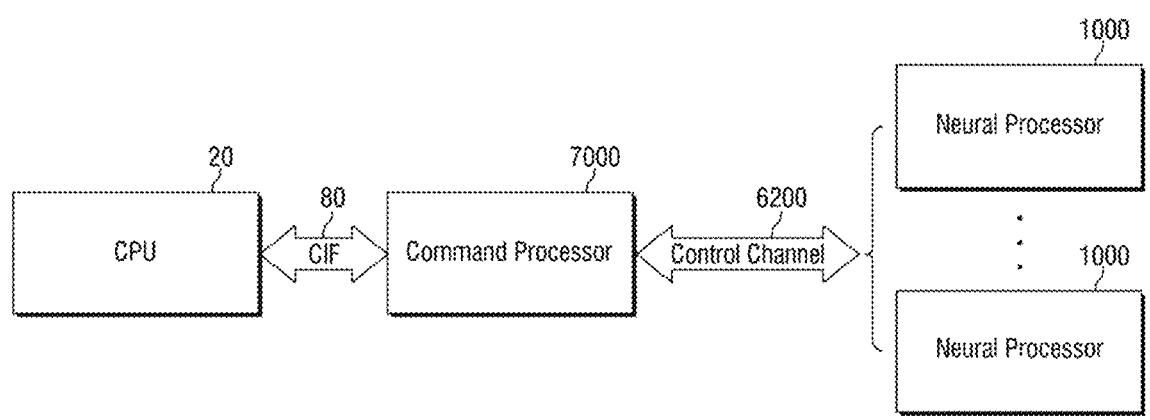
FIG. 5 is a block diagram provided to explain the flow of control signals of the neural processing device of FIG. 1.

FIG. 5 is a block diagram provided to explain the flow of control signals of the neural processing device of FIG. 1.

Referring to FIG. 5, the CPU 20 may transfer a control signal to the command processor 7000 through the control interface 80. The control signal may be a signal to instruct to perform each operation including a computation work, a data load/store work, etc.

The command processor 7000 may receive the control signal and transmit the control signal to the at least one neural processor 1000 through the control channel 6200. Each control signal may be stored as each task in the neural processor 1000.

Figure 6:
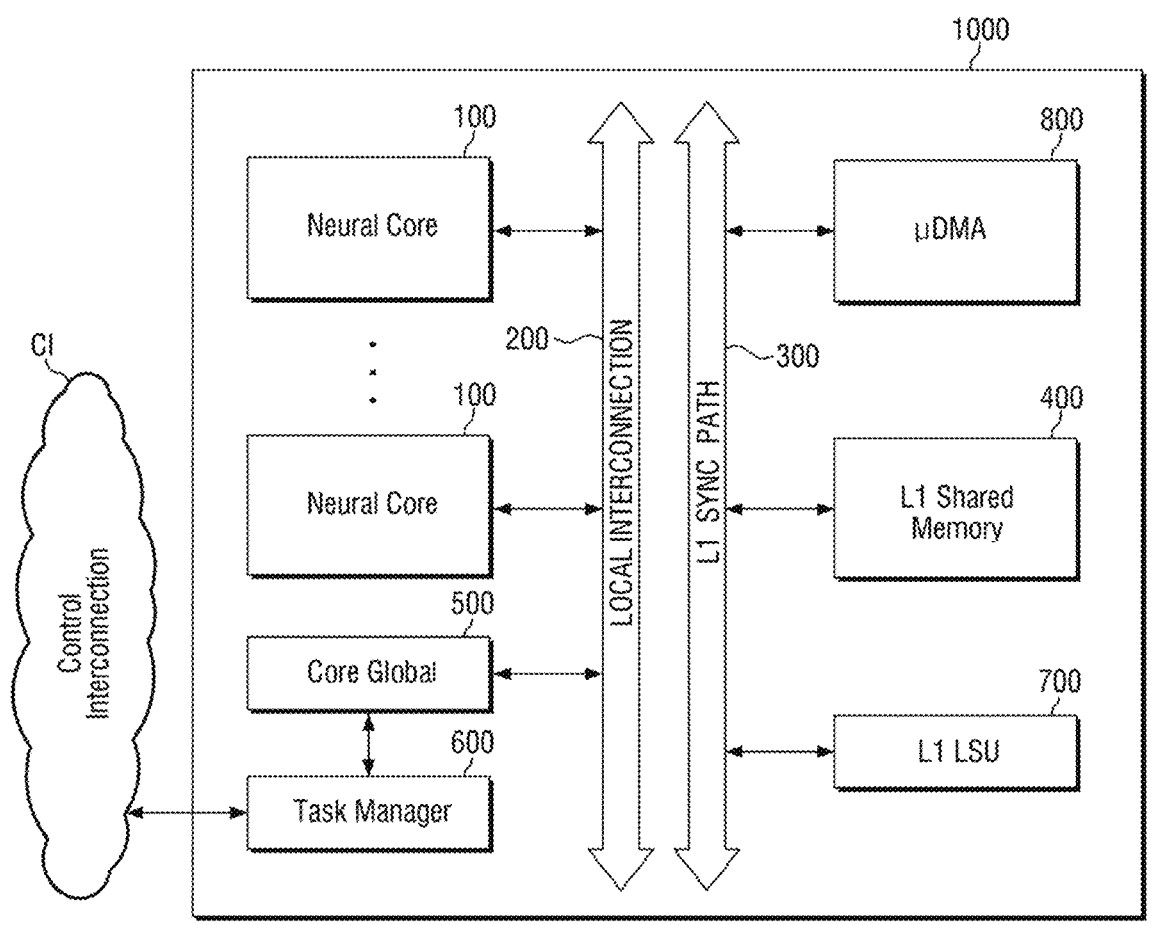
FIG. 6 is a block diagram provided to explain the neural processor of FIG. 3 in detail.

FIG. 6 is a block diagram provided to explain the neural processor of FIG. 3 in detail.

Referring to FIGS. 3 to 6, the neural processor 1000 may include at least one neural core 100, an L1 shared memory 400, an L1 LSU 700, a task manager 600, a core global 500, a micro DMA 800, a local interconnection 200, and an L1 sync path 300.

At least one neural core 100 may divide and perform the work of the neural processor 1000. For example, there may be eight neural cores 100. However, aspects are not limited to the above. Although it is shown in FIGS. 3 and 5 that several neural cores 100 are included in the neural processor 1000, aspects are not limited to the above. That is, the neural processor 1000 may be configured with only one neural core 100.

The neural core 100 may receive task information from the core global 500 and perform a task according to the task information. The task may be defined by the control signals, and the task may be either a compute operation or a memory operation. The memory operation may be, for example, any one of micro DMA (μDMA), LP micro DMA (low priority μDMA), store μDMA (STμDMA), and pre-processing works.

The L1 shared memory 400 may be a memory shared by each neural core 100 in the neural processor 1000. The L1 shared memory 400 may store data of each neural core 100. In addition, the L1 shared memory 400 may receive data from the shared memory 2000 of FIG. 4, temporarily store the data, and transmit the data to each neural core 100. Conversely, the L1 shared memory 400 may receive data from the neural core 100, temporarily store the data, and transfer the data to the shared memory 2000 of FIG. 3. The L1 shared memory 400 may be an on-chip memory that is the target of the method for allocating on-chip memory of the present disclosure.

The L1 shared memory 400 may be a memory corresponding to the neural processor level, that is, to level 1 (L1). The L2 shared memory, that is, the shared memory 2000 may be shared by the neural processor 1000, and the L1 shared memory 400 may be shared by the neural core 100.

The L1 LSU 700 may receive at least one of data, control signals, and synchronization signals from the outside through the global interconnection 6000. The L1 LSU 700 may transmit at least one of the data, the control signals, and the synchronization signals received by the L1 shared memory 400. Similarly, the L1 LSU 700 may transmit at least one of the data, the control signals, and the synchronization signals to the outside through the global interconnection 6000. Further, for each of the neural cores 100, the L1 LSU 700 may transmit and receive at least one of the data, the control signals, and the synchronization signals.

The neural core 100 may receive task information from the core global 500 and perform a task according to the task information. The task may be a work related to the computation work or the memory operation. The task may be defined by the control signals. The task information is information on the task, and it may be information on type of task, form of task, additional information on task, etc.

The neural core 100 may transmit a completion signal indicating completion of the task to the core global 500.

The task manager 600 may receive a task from the control interconnection (CI). The control interconnection (CI) may be a general term for the transmission interfaces that transmit the tasks from the command processor 7000. That is, the control interconnection (CI) may include the control channel 6200 and the local interconnection 200.

The task manager 600 may receive a task, generate task information, and transmit the result to the core global 500. Further, the task manager 600 may receive a completion signal through the core global 500, accordingly generate a completion report, and transmit the result to the command processor 7000 through the control interconnection (CI).

The core global 500 may be a wire structure connected in hardware within the neural core 100. Although not illustrated, the core global 500 may be a structure that connects the neural core 100, the L1 shared memory 400, the L1 LSU 700, and the task manager 600. Accordingly, the local interconnection 200 and the L1 sync path 300 may also be included in the core global 500. However, aspects are not limited to the above.

The core global 500 may receive the task information from the task manager 600, transmit the same to the neural core 100, and receive a corresponding completion signal from the neural core 100. The core global 500 may transmit the completion signal to the task manager 600.

If the L1 shared memory 400 is a memory that is the target of the method for allocating on-chip memory of the present disclosure, the task manager 600 and/or the core global 500 may use the method for allocating on-chip memory of the present disclosure to manage memory allocation of the L1 shared memory 400.

The micro DMA 800 may directly control the movement of data without requiring the command processor 7000 or the neural core 100 to control input and output of data. Accordingly, the micro DMA 800 may control the movement of data between memories to minimize the number of interrupts of the command processor 7000 or the neural core 100.

The micro DMA 800 may control the movement of data between the L1 shared memory 400, the shared memory 2000, and the off-chip memory 30. The movement of data may be performed through the authority of the micro DMA 800.

The local interconnection 200 may connect at least one neural core 100, the L1 shared memory 400, the L1 LSU 700, the micro DMA 800, the core global 500, and the task manager 600 to one another. The local interconnection 200 may be a path through which data moves between at least one neural core 100, the L1 shared memory 400, the L1 LSU 700, the micro DMA 800, the core global 500, and the task manager 600. The local interconnection 200 may be connected to the global interconnection 6000 of FIG. 3 to transmit the data.

The L1 sync path 300 may connect at least one neural core 100, the L1 shared memory 400, the L1 LSU 700, the micro DMA 800, the core global 500, and the task manager 600.

The L1 sync path 300 may be a path through which the synchronization signals of at least one neural core 100, the L1 shared memory 400, the L1 LSU 700, the micro DMA 800, the core global 500, and the task manager 600 move.

The L1 sync path 300 may be physically separated from the local interconnection 200. Unlike the global interconnection 6000, the local interconnection 200 may not have sufficient channels formed therein. In this case, the L1 sync path 300 may be formed separately such that it is possible to perform transfer of the synchronization signal quickly and without delay. The L1 sync path 300 may be used for synchronization performed at a level that is one level lower than the L2 sync channel 6300 of the global interconnection 6000.

Figure 7:
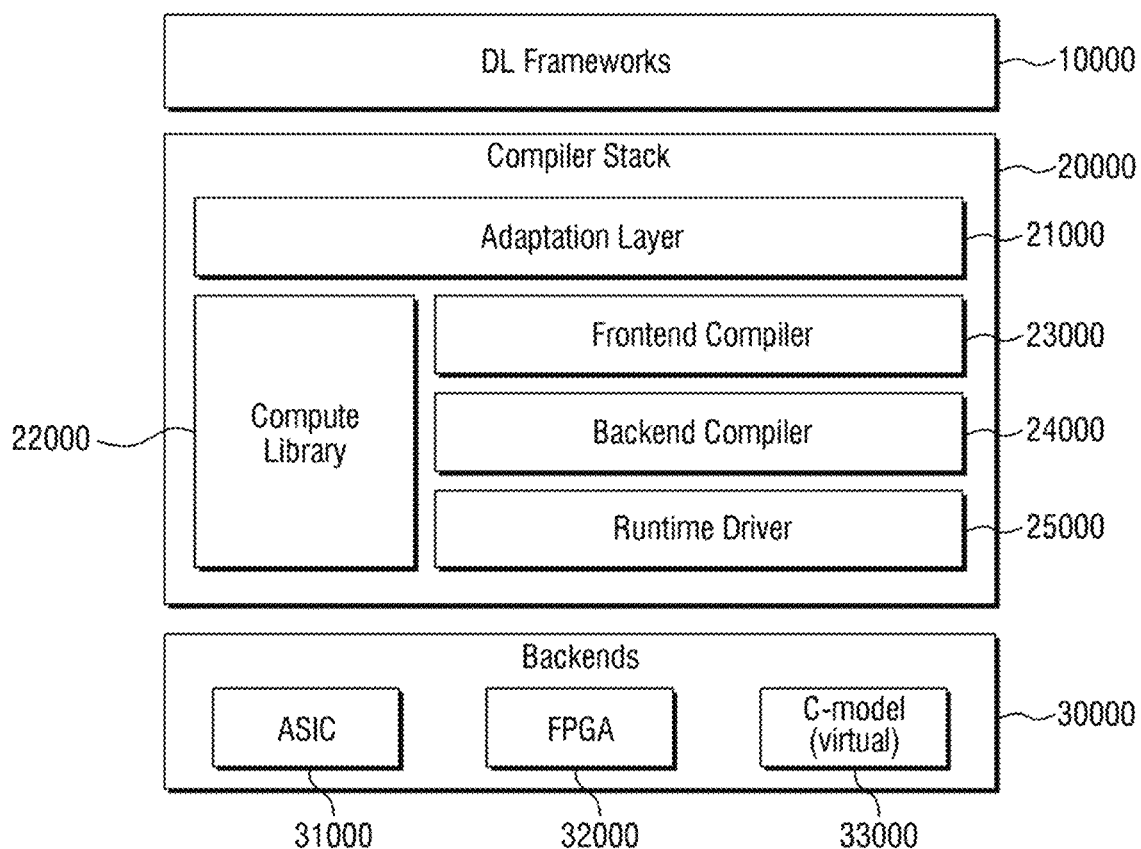
FIG. 7 is a block diagram provided to explain a software hierarchy of a neural processing device.

FIG. 7 is a block diagram provided to explain a software hierarchy of a neural processing device.

Referring to FIG. 7, the software layer structure of the neural processing device according to some examples may include a DL framework 10000, a compiler stack 20000, and a backend module 30000.

The DL framework 10000 may refer to a framework for a deep learning model network used by the user. For example, a fully trained neural network may be generated using programs such as TensorFlow or Py Torch.

The compiler stack 20000 may include an adaptation layer 21000, a compute library 22000, a frontend compiler 23000, a backend compiler 24000, and a runtime driver 25000.

The adaptation layer 21000 may be a layer in contact with the DL framework 10000. The adaptation layer 21000 may quantize the user's neural network model generated in the DL framework 10000 and modify the graph. In addition, the adaptation layer 21000 may convert the type of the model into a required type.

The frontend compiler 23000 may convert various neural network models and graphs received from the adaptation layer 21000 into a certain intermediate representation (IR). The converted IR may be a preset expression that is easy to handle later in the backend compiler 24000.

The IR of the frontend compiler 23000 may be optimized in advance at the graph level. In addition, the frontend compiler 23000 may generate the IR by way of conversion into a hardware-optimized layout.

The backend compiler 24000 optimizes the IR converted in the frontend compiler 23000, and converts this into a binary file for use by the runtime driver. The backend compiler 24000 may generate optimized code by dividing the job at a scale that matches the details of the hardware.

Among various operations, the compute library 22000 may store template operations designed in a form suitable for hardware. The compute library 22000 provides the backend compiler 24000 with several template operations that require hardware, thereby generating optimized code.

During operation, the runtime driver 25000 may continuously perform monitoring so as to operate the neural network device according to some examples. Specifically, it may be responsible for executing the interface of the neural network device.

The backend module 30000 may include an application specific integrated circuit (ASIC) 31000, a field programmable gate array (FPGA) 32000, and a C-model 33000. The ASIC 31000 may refer to a hardware chip determined according to a predetermined way of design. The FPGA 32000 may be a programmable hardware chip. The C-model 33000 may refer to a model implemented by simulating hardware on software.

The backend module 30000 may perform various works and derive results using binary code generated through the compiler stack 20000.

Figure 8:
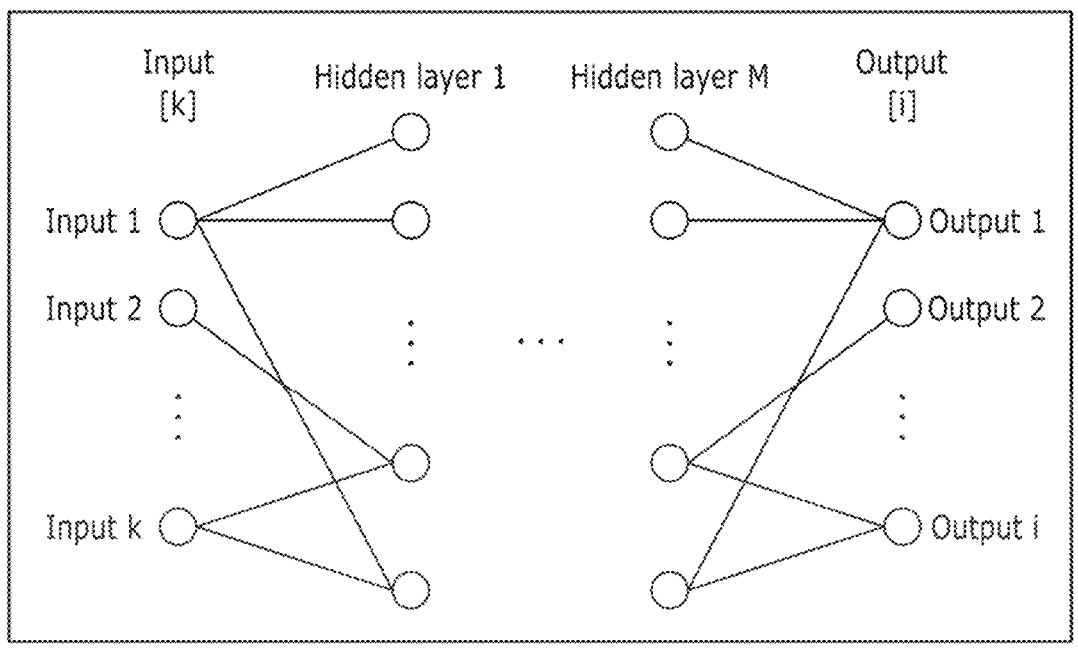
FIG. 8 is a conceptual diagram provided to explain a structure of a neural network of a deep learning work executed by a processing unit.

FIG. 8 is a conceptual diagram provided to explain a structure of a neural network of a deep learning work executed by the processing unit. Referring to FIG. 8, the neural network may include input layers (Input 1 to Input k) that include input nodes that receive input data, output layers (Output 1 to Output i) that include output nodes that output output data, and M hidden layers between the input and output layers.

Weights may be set on edges connecting the nodes of each layer. These weights or presence or absence of edges may be added, removed, or updated during the training process. Therefore, through the training process, the weights of nodes and edges arranged between k input nodes and i output nodes may be updated.

Before the neural network performs learning, all nodes and edges may be set to initial values. With the cumulative input of information, the weights of the nodes and edges may be changed, and in this process, matching between parameters input as the training factors and values assigned to the output nodes may be performed. In addition, the weights of nodes and edges between the input and output nodes of the neural network may be updated through the training process of the neural network.

Figure 9:
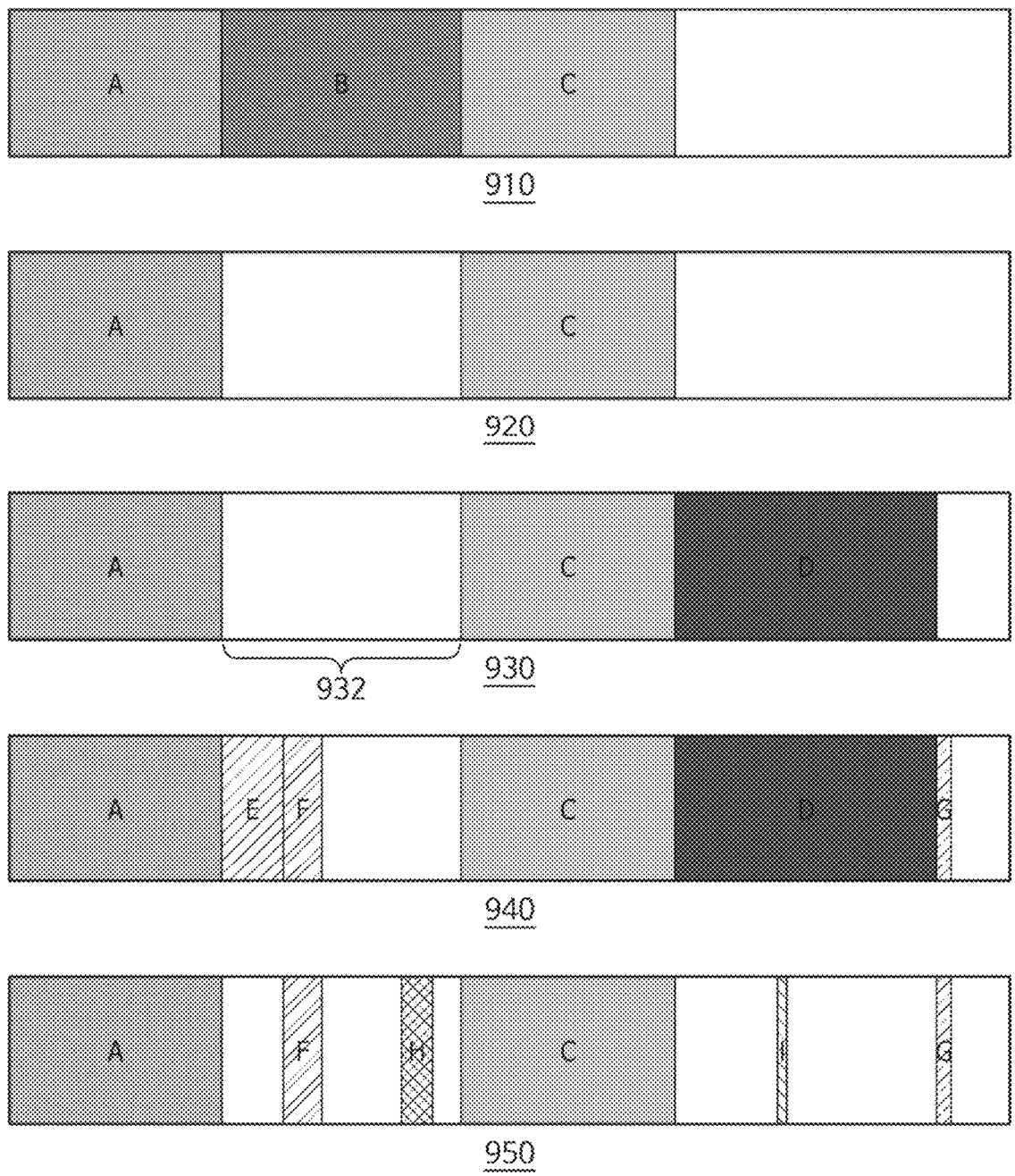
FIG. 9 is a diagram provided to explain the memory fragmentation.

FIG. 9 is a diagram provided to explain the memory fragmentation. According to the related art, the probability that the memory fragmentation may occur may increase as the allocation and deallocation of the memory is repeated.

For example, a first state 910 represents a state in which a first block is allocated with data A, a second block is allocated with data B, and a third block is allocated with data C, in which the remainder of the memory is a free block. If the use of the memory of the data B is finished in the first state 910, the second block is deallocated and the second block is converted into a free block. In this case, the state of the memory changes to a second state 920. In this second state 920, a memory allocation request for data D may be received.

A third state 930 represents a state in which the data D is allocated to a fourth block of the free blocks of the second state 920. The size of a free block 932 between the first block and the third block is smaller than the size of data D, and data D cannot be allocated to the free block 932, so data D is allocated to the fourth block.

A fourth state 940 and a fifth state 950 represent states after the third state 930, in which the memory allocation and/or deallocation has repeated a plurality of times. For example, the fourth state 940 may represent a state after the third state 930, in which data E, data F, and data G are additionally allocated to some areas of the memory. In addition, the fifth state 950 may represent a state after the fourth state 940, in which the memory areas allocated with data D and data E is deallocated, and data H and data I are additionally allocated to some areas of the memory.

As illustrated in the example of the fifth state 950, according to the related art, the memory fragmentation in which the available memory area is divided into very small segments may occur. If the memory fragmentation occurs, the probability that there is no single free block large enough to meet the memory allocation request may increase. If the on-chip memory space is insufficient due to the memory fragmentation, it may have a negative impact on system performance and efficiency, such as system delay and power consumption. For example, due to the frequent use of the off-chip memory, problems may occur such that there can be delays, the entire operation can not be performed at once and is calculated separately, a memory flush may occur, thus preventing use of the stored data, or data for the next operation can not be loaded in advance. Therefore, it is necessary to prevent memory fragmentation in advance to avoid the negative effects on system performance and efficiency.

Figure 10:
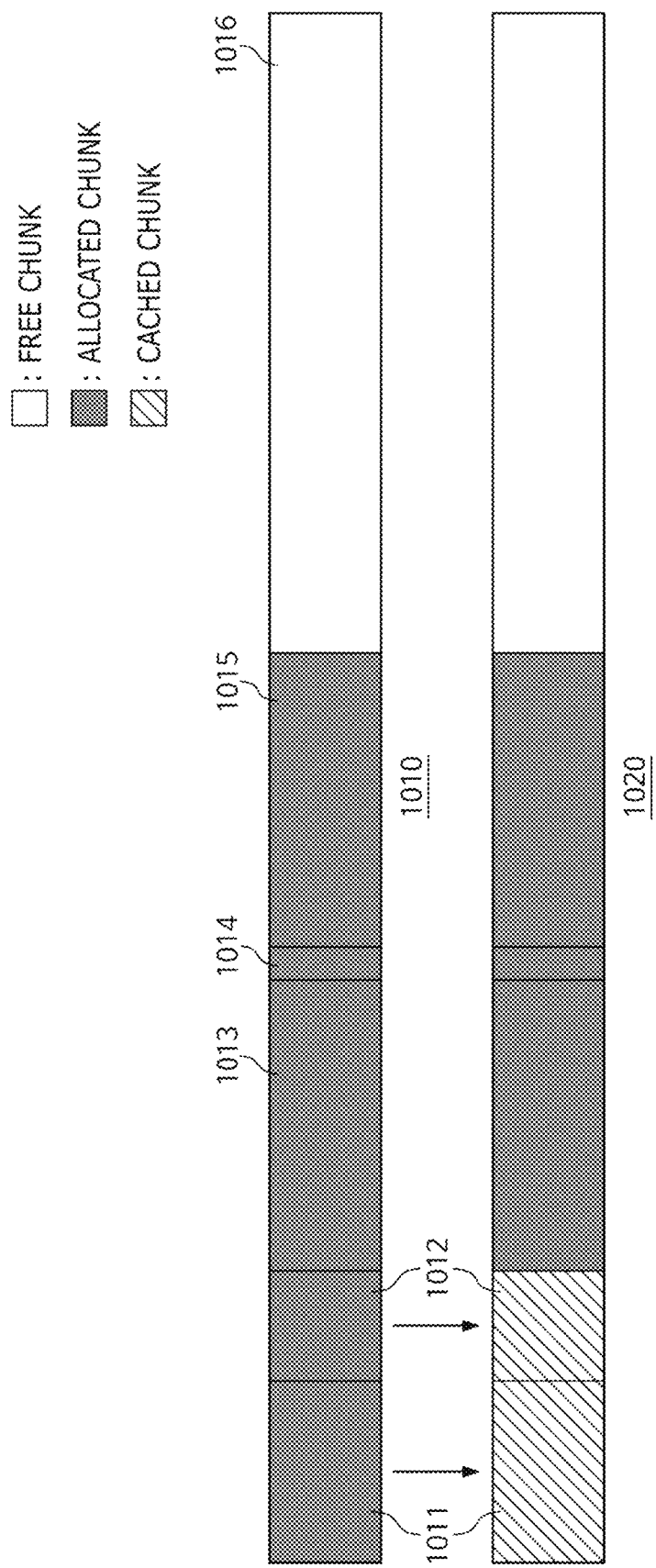
FIG. 10 is a diagram illustrating an example in which an allocated chunk is converted into a cached chunk.

FIG. 10 is a diagram illustrating an example in which an allocated chunk is converted into a cached chunk. The neural processing system may perform training and/or inference of a machine learning model (e.g., neural network) through the execution of an artificial intelligence application. In general, machine learning models often have overlapping layers, so data of the same or similar size is used repeatedly in the artificial intelligence application. Therefore, it may be expected that a memory allocation request of the same size as the previously allocated memory size will occur in the near future. In consideration of this, the neural processing system may convert deallocated memory chunks of the on-chip memory into cached chunks instead of immediately converting these into free chunks, thereby suspending their use as free chunks. In addition, the neural processing system may preferentially allocate the cached chunks for the data of the same or similar size, thereby preventing memory fragmentation.

For example, the on-chip memory may be the shared memory 2000 of FIG. 3 and/or the L1 shared memory 400 of FIG. 6, etc., but is not limited thereto. The on-chip memory may include a plurality of chunks, and the plurality of chunks may be classified as one of: an allocated chunk indicating that the memory chunk is in a state of being allocated for any data; a cached chunk indicating that the memory chunk was allocated for any data, then deallocated, and is in a holding state before being converted into a free chunk; or a free chunk indicating that the memory chunk is not allocated for any data and is a chunk other than the cached chunk.

Referring to FIG. 10, a first state 1010 is a state that first to fifth chunks 1011, 1012, 1013, 1014, and 1015 of the memory are the allocated chunks, and a sixth chunk 1016 is a free chunk. If the use of the memory of the data allocated to the first chunk 1011 is finished, the neural processing system may deallocate the first chunk 1011 and convert the first chunk 1011 into a cached chunk. In addition, if the use of the memory of the data allocated to the second chunk 1012 is finished, the neural processing system may deallocate the second chunk 1012 and convert the second chunk 1012 into a cached chunk. In this case, the state of the memory may be changed to a second state 1020. Unlike the free chunk, two consecutive cached chunks (the first chunk 1011 and the second chunk 1012) may not be treated as one cached chunk, but treated as separate cached chunks.

Figure 11:
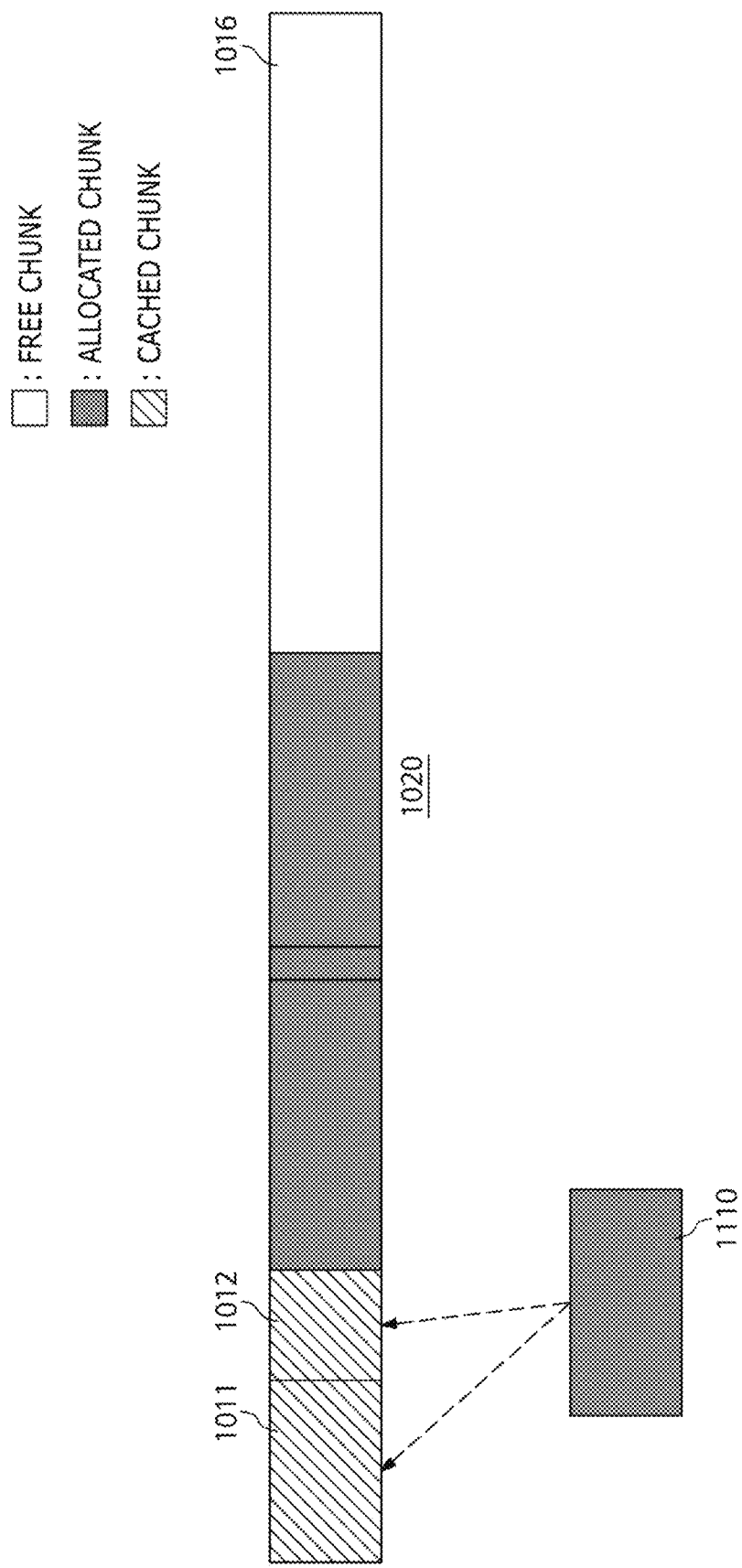
FIG. 11 is a diagram illustrating an example in which the neural processing system determines whether there is a cached chunk allocable for first data.

FIG. 11 is a diagram illustrating an example in which the neural processing system determines whether there is a cached chunk allocable for first data 1110. In the second state 1020, the neural processing system may receive a memory allocation request for the first data 1110. The neural processing system may determine whether there is a cached chunk of the cached chunks that is allocable for the first data 1110, based on a comparison between the size of the first data 1110 for which the allocation request is received and the size of the cached chunk.

For example, the neural processing system may determine whether there is a cached chunk of the cached chunks that has the same size as the size of the first data 1110. Specifically, the neural processing system may compare to determine whether the size of the first data 1110 and the size of the first chunk 1011 are the same as each other, and compare to determine whether the size of the first data 1110 and the size of the second chunk 1012 are the same as each other. Referring to the example illustrated in FIG. 11, the neural processing system may determine that there is no cached chunk with the same size as the size of the first data 1110. That is, the neural processing system may determine that there is no cached chunk allocable for the first data 1110.

If it is determined that there is no cached chunk allocable for the first data 1110, the neural processing system may allocate the first data 1110 to at least a portion of the sixth chunk 1016 which is a free chunk.

Figure 12:
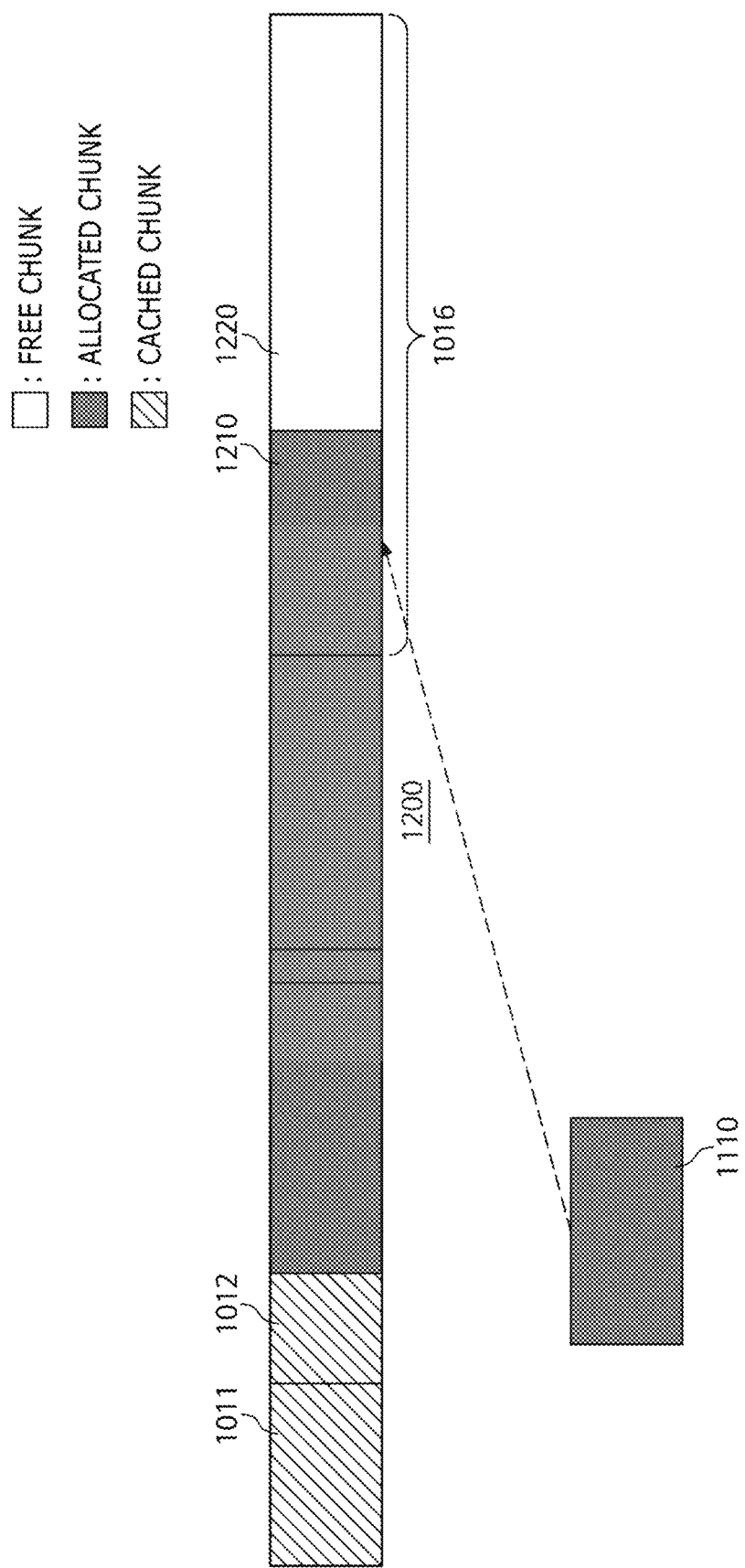
FIG. 12 is a diagram illustrating an example in which the neural processing system allocates the first data to at least a portion of the free chunk.

FIG. 12 is a diagram illustrating an example in which the neural processing system allocates the first data 1110 to at least a portion of the free chunk. Upon determining that there is no cached chunk allocable for the first data 1110, the neural processing system may allocate the first data 1110 to the seventh chunk 1210 which is a portion of the sixth chunk 1016 corresponding to the free chunk. A third state 1200 represents a state after the second state 1020, in which memory allocation for the first data 1110 is finished. In the third state 1200, the sixth chunk 1016, which was the free chunk in the second state 1020, may be divided into a seventh chunk 1210 which is an allocated chunk, and an eighth chunk 1220 which is a free chunk.

Figure 13:
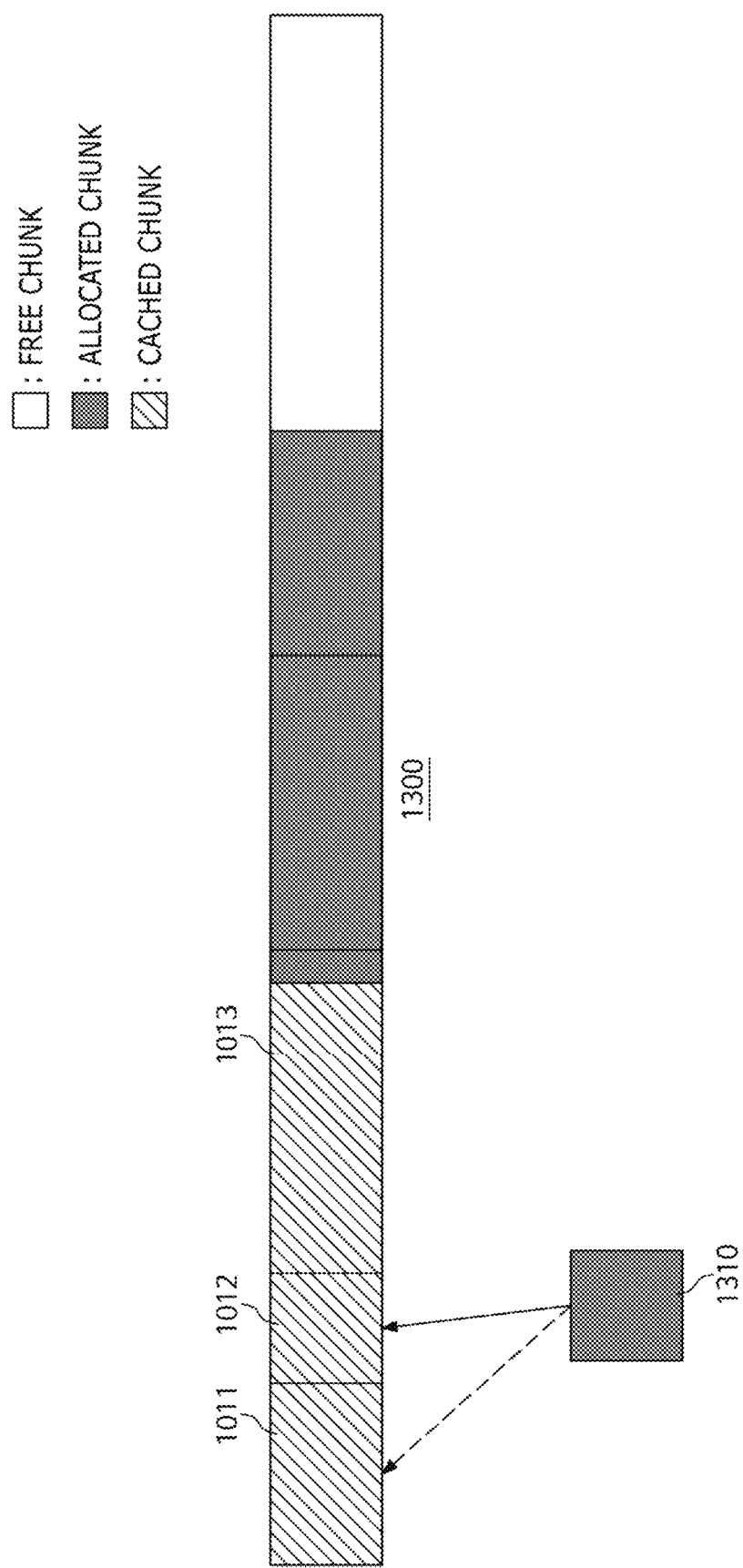
FIG. 13 is a diagram illustrating an example in which the neural processing system determines whether there is a cached chunk allocable for second data.

FIG. 13 is a diagram illustrating an example in which the neural processing system determines whether there is a cached chunk allocable for second data 1310. A fourth state 1300 represents a state in which the first to third chunks 1011, 1012, and 1013 of the memory are cached chunks. In the fourth state 1300, the neural processing system may receive a memory allocation request for the second data 1310. The neural processing system may determine whether there is a cached chunk of the cached chunks that is allocable for the second data 1310, based on a comparison between the size of the second data 1310 and the size of the cached chunk.

For example, the neural processing system may determine whether there is a cached chunk of the cached chunks that has the same size as the size of the second data 1310. Specifically, the neural processing system may compare to determine whether the size of the second data 1310 and the size of the first chunk 1011 are the same as each other, and compare to determine whether the size of the second data 1310 and the size of the second chunk 1012 are the same as each other. Referring to the example illustrated in FIG. 13, the neural processing system may determine that the size of the second chunk 1012 is the same as the size of the second data 1310. That is, the neural processing system may determine that there is a cached chunk allocable for the second data 1310.

Upon determining that there is a cached chunk allocable for the data, the neural processing system may stop comparing the size of the data and the size of the cached chunk. That is, if it is determined that the size of the second chunk 1012 is the same as the size of the second data 1310, the neural processing system may stop comparing the size of the third chunk 1013 which is the remaining cached chunk, with the size of the second data 1310, and end the process of determining whether there is an allocable cached chunk.

Figure 14:
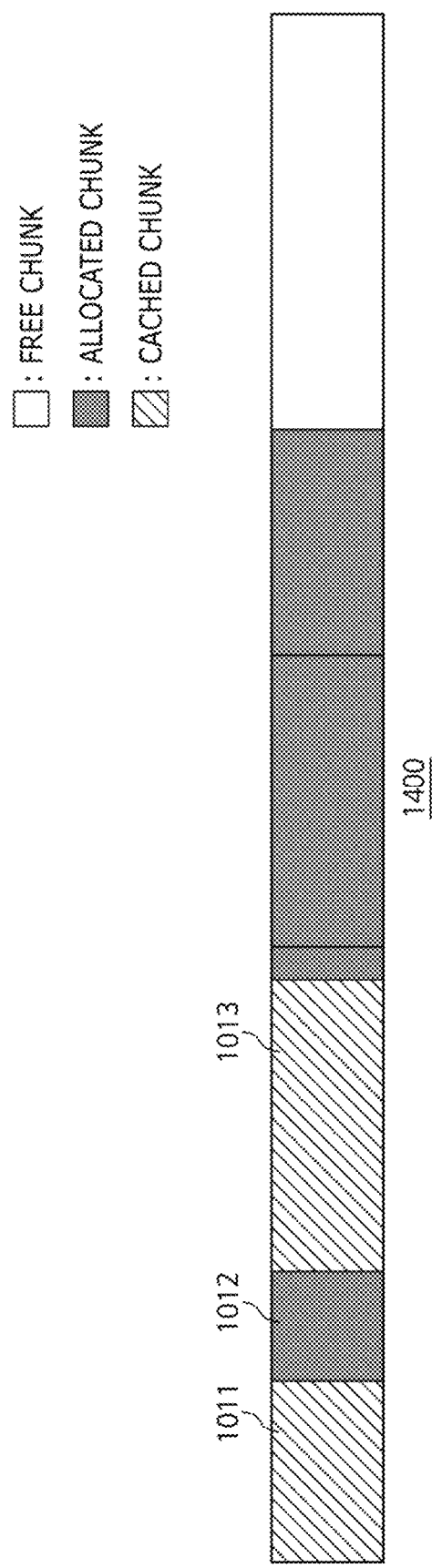
FIG. 14 is a diagram illustrating an example in which the neural processing system allocates the second data to a second chunk.

FIG. 14 is a diagram illustrating an example in which the neural processing system allocates the second data to the second chunk. Upon determining that the size of the second chunk 1012 is the same as the size of the second data 1310, the neural processing system may allocate the second data 1310 to the second chunk 1012. The fifth state 1400 represents a state after the fourth state 1300, in which memory allocation for the second data 1310 is finished. The machine learning models often have overlapping layers, so data of the same or similar size is used repeatedly in the artificial intelligence application. Therefore, after the fifth state 1400, data of the same or similar size to the cached chunk may also be allocated to the remaining cached chunks (e.g., the first chunk 1011 and the third chunk 1013) such as the second chunk 1012 by a process similar to the process described above, thereby preventing memory fragmentation.

In the example described above, when determining whether there is a cached chunk allocable for specific data, the neural processing system determines whether there is a cached chunk with the same size as the size of the data and allocates the data to a cached chunk with the same size, or, allocates the data to a free chunk if there is no cached chunk with the same size. However, this is merely an example, and the neural processing system may allocate the data not only to a cached chunk with the same size as the size of the data, but also to a cached chunk with a size that is greater than, but similar to the data size.

For example, the neural processing system may determine, among the cached chunks having a predefined range associated with each of them, whether there is a cached chunk having the predefined range to which the size of specific data falls into, thereby determining whether there is a cached chunk allocable for the specific data. An upper limit of the predefined range associated with each of the cached chunks may be a size of each of the cached chunks, and a lower limit of the predefined range associated with each of the cached chunks may be a product of predefined ratio (it may be any real number greater than 0 and less than 1) and the size of each of the cached chunks. As a specific example, if the predefined ratio is 0.8, the neural processing system may determine whether there is a cached chunk of the cached chunks that meets the condition that the size of specific data is 0.8 or greater than the size of the cached chunk and is less than or equal to the size of the cached chunk. If there is a cached chunk that meets the above condition, the neural processing system may allocate the specific data to the corresponding chunk.

The predefined ratio may be determined by considering a memory format (e.g., order of dimensions sorted in memory, etc.) of input or output data (e.g., input activation, weight, etc. as the input data, and output activation, etc. as the output data) with respect to the on-chip memory, and a data layout of artificial intelligence application being executed and compiled. For example, it may be assumed that the size of the input data to the first layer of the machine learning model trained/inferred by the artificial intelligence application executed/compiled by the neural processing system is 16*16*64(h*w*c), that the size of the input data to the second layer is 7*7*256(h*w*c), and that w of the data is always an even number in the hardware layout of the on-chip memory. In this case, if the predefined ratio is determined to be 0.875, the possibility that the memory chunk allocated for the input data to the first layer will be reallocated for the input data to the second layer may increase.

Figure 15:
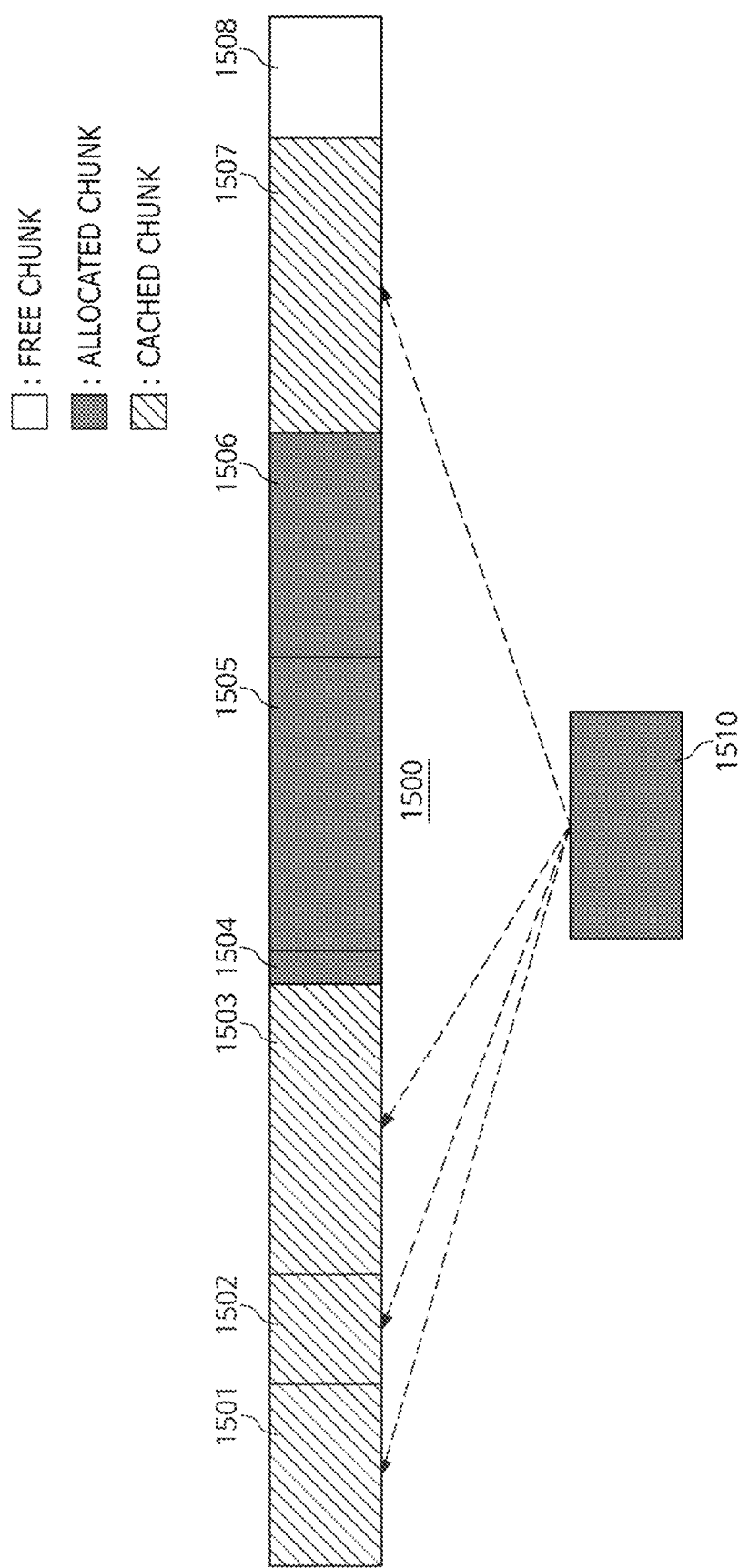
FIG. 15 is a diagram illustrating an example in which the neural processing system converts cached chunks into free chunks.

FIG. 15 is a diagram illustrating an example in which the neural processing system converts cached chunks into free chunks. The neural processing system may convert cached chunks to free chunks under certain conditions to efficiently manage the use of the memory space.

For example, the neural processing system may convert a cached chunk of one or more cached chunks into a free chunk, if a number of times that the cached chunk is not allocated with any data as a result of size comparison with the data is equal to or greater than a first predefined number of times. The first predefined number of times may vary depending on the structure (e.g., number of repeated layers, etc.) of the machine learning model trained/inferred in the artificial intelligence application, data (specific example, size distribution of data) used in the machine learning model, capacity of the on-chip memory, etc. For example, in a computer vision model such as ResNet, the conv2d-batchnorm-relu layer is sequentially repeated 3 times, in which case the first predefined number of times may be defined to be 3 or 4. As another example, in a Transformer series encoder-decoder structure model such as T5 (Text To Text Transfer Transformer), there are dozens of layers in one encoder/decoder, in which case the first predefined number may be defined to be 10 or more.

Additionally or alternatively, if there is no cached chunk allocable for the specific data subject to on-chip memory allocation, and if there is no free chunk allocable for the specific data, the neural processing system may convert at least a portion of the cached chunk into free chunk.

For example, referring to FIG. 15, a sixth state 1500 may represent a state in which first to third chunks 1501, 1502, 1503 and a seventh chunk 1507 of the memory are cached chunks, and fourth to sixth chunks 1504, 1505, and 1506 are allocated chunks, and an eighth chunk 1508 is a free chunk. In the sixth state 1500, the neural processing system may receive a memory allocation request for third data 1510. The neural processing system may determine whether there is a cached chunk of the cached chunks 1501, 1502, 1503, and 1507 that is allocable for the third data 1510, based on a comparison between the size of the third data 1510 for which the allocation request is received and the size of the cached chunks 1501, 1502, 1503, and 1507.

If it is determined that there is no cached chunk that is allocable for the third data 1510, the neural processing system may determine whether there is a free chunk that is allocable for the third data 1510. In general, a plurality of consecutive free chunks may be regarded as one free chunk, and if the size of the free chunk is greater than or equal to the size of the data, data may be allocated to at least a portion of the free chunk. Referring to FIG. 15, since the size of the eighth chunk 1508 which is the free chunk is smaller than the size of the third data 1510, the neural processing system may determine that there is no free chunk allocable for the third data 1510.

In this case, the neural processing system may convert at least a portion of the cached chunks 1501, 1502, 1503, and 1507 into a free chunk. For example, the neural processing system may convert all cached chunks 1501, 1502, 1503, and 1507 into free chunks. As another example, the neural processing system may convert a portion of the cached chunks 1501, 1502, 1503, and 1507 into free chunks according to any cache removal method, such as Recently Used (LRU), Least Frequently Used (LFU), First In First Out (FIFO), Last In First Out (LIFO), Most Recently Used (MRU), Random Replacement (RR).

Figure 16:
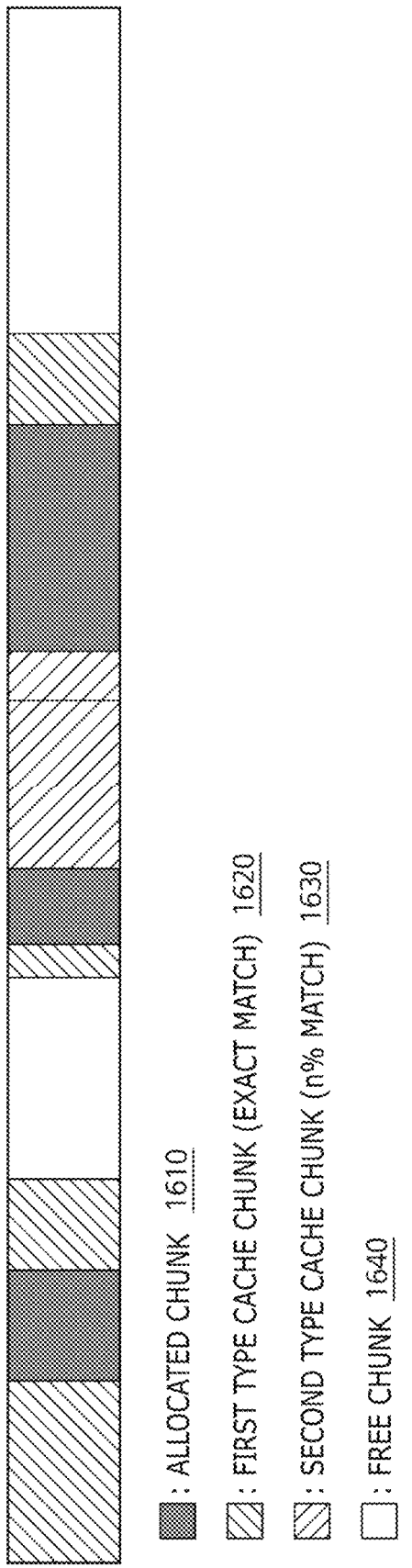
FIG. 16 is a diagram illustrating an example in which a cached chunk is subdivided into a plurality of types of cached chunks.

FIG. 16 is a diagram illustrating an example in which a cached chunk is subdivided into a plurality of types of cached chunks. Each of the plurality of chunks included in the memory may be classified into one of an allocated chunk 1610, a cached chunk, or a free chunk 1640, and the cached chunk may be further subdivided into a plurality of types. For example, the cached chunk may be classified as either a first type cached chunk 1620 or a second type cached chunk 1630.

The first type cached chunk 1620 may be a type of cached chunk such that the data to be allocated is allocated to the cached chunk if the size of the data to be allocated is the same as the size of the data of the cached chunk. In addition, the second type cached chunk 1630 may be a type of cached chunk such that the data to be allocated is allocated to the cached chunk if the size of the data to be allocated falls into a predefined range associated with the cached chunk.

If the allocated chunk is deallocated and converted into a cached chunk, whether this chunk will be converted into the first type or the second type may be determined depending on the type of data allocated to the chunk. For example, the size of weight data (e.g., kernel data) is fixedly set for a particular layer, and as the corresponding layer is iterated, it may be expected that a memory allocation request for the weight data of the same size would occur in the near future. If the allocated chunk finished with the use of the memory is a chunk allocated for the weight data of the artificial intelligence application, the neural processing system may convert the chunk into the first type cached chunk 1620 when deallocating the chunk. Alternatively, the memory format (e.g., order of dimensions sorted in memory, etc.) of the input or output data may need to be considered. Therefore, if the allocated chunk finished with the use of the memory is a chunk allocated for the input data or output data to or from the artificial intelligence application, the neural processing system may deallocate the chunk and convert it into the second type cached chunk 1630.

Figure 17:
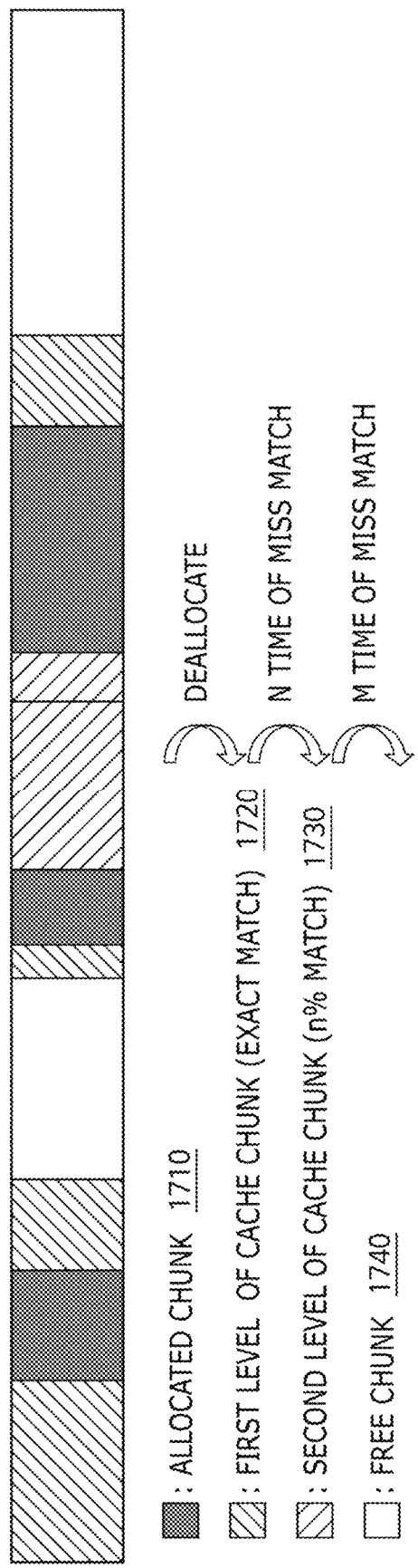
FIG. 17 is a diagram illustrating an example in which a cached chunk is stratified into a plurality of levels of cached chunks.

FIG. 17 is a diagram illustrating an example in which the cached chunk is stratified into a plurality of levels of cached chunks. Each of the plurality of chunks included in the memory may be classified into one of an allocated chunk 1710, a cached chunk, or a free chunk 1740, and the cached chunk may be stratified into a plurality of levels of cached chunks. For example, the cached chunk may be classified as either a first level cached chunk 1720 or a second level cached chunk 1730.

The first level cached chunk 1720 may be a type of cached chunk such that data to be allocated is allocated to the cached chunk if the size of the data to be allocated is the same as the size of the data of the cached chunk. In addition, the second level cached chunk 1730 may be a type of cached chunk such that the data to be allocated is allocated to the cached chunk if the size of the data to be allocated falls into a predefined range associated with the cached chunk.

In order to allocate the on-chip memory for specific data, the neural processing system may determine whether there is an allocable chunk among the first level cached chunks 1720, and if there is no first level cached chunk 1720 that is allocable, may sequentially determine whether there is an allocable chunk in the second level cached chunks 1730. For example, the process of allocating the on-chip memory for the specific data will be described in detail elsewhere with reference to FIG. 19.

The neural processing system may convert the level of the memory chunk to a lower level under certain conditions. For example, upon deallocating the allocated chunk 1710, the neural processing system may convert this chunk into the first level cached chunk 1720. In addition, the neural processing system may convert a cached chunk of the first level cached chunks into the second level free chunk, if a number of times that the cached chunk is not allocated with any data as a result of size comparison with the data is equal to or greater than a second predefined number of times (N times in the illustrated example, where, N is a natural number). In addition, the neural processing system may convert a cached chunk of the second level cached chunks into the free chunk 1740, if a number of times that the cached chunk is not allocated with any data as a result of size comparison with the data is equal to or greater than a third predefined number of times (M times in the illustrated example, where M is a natural number).

Figure 18:
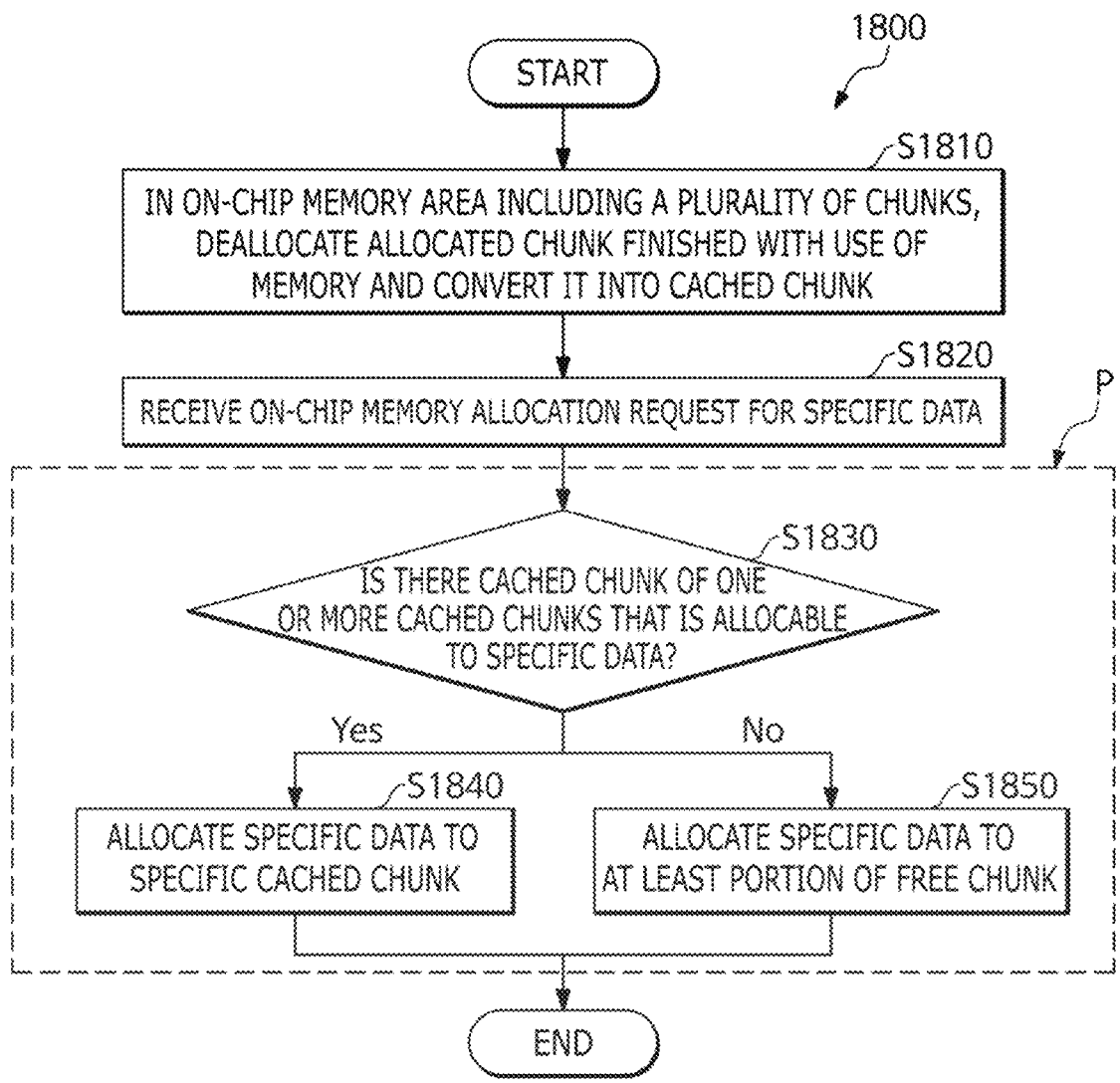
FIG. 18 is a flowchart illustrating an example of a method for allocating on-chip memory of a neural processing unit.

FIG. 18 is a flowchart illustrating an example of a method 1800 for allocating the on-chip memory of the neural processing unit. The method 1800 may be performed by at least one processor. For example, the method may be performed by at least one processor of the host system (HS) of FIG. 1, the command processor 7000 of FIG. 3, the CPU 20 of FIG. 5, the task manager 600 of FIG. 6, and the core global 500 of FIG. 6, the backend compiler 24000 of FIG. 7, etc.

The method 1800 may be performed while the artificial intelligence application is running or compiling. As a specific example, the method 1800 may be performed in the process of compiling the artificial intelligence application by at least one processor (e.g., backend compiler 24000) of the host system (HS). In this case, the compilation result may include the memory allocation according to the method of the examples described above, and the artificial intelligence application may be executed using the compilation result.

As another specific example, the method 1800 may be performed in the process of executing the artificial intelligence application by at least one processor (e.g., the command processor 7000, the task manager 600, the core global 500, etc.) of the neural processing device. In this case, the entity that manages the memory allocation according to the method 1800 may vary depending on the hierarchical position of the on-chip memory. For example, if the on-chip memory to be allocated is the shared memory 2000 of the SoC level, the command processor 7000 of the same SoC level may manage allocation of the shared memory 2000 according to the method 1800. As another example, if the on-chip memory to be allocated is the L1 shared memory 400 of the processor level, the task manager 600 or the core global 500 of the same processor level may manage the allocation of the L1 shared memory 400 according to the method 1800. That is, a processor located in the same layer as the on-chip memory may manage the allocation of the on-chip memory according to the method 1800.

The on-chip memory of the neural processing unit may be a memory configured to be located on the same chip as the neural processing unit. In addition, the on-chip memory of the neural processing unit may include a plurality of chunks, and the plurality of chunks may be classified as any of: an allocated chunk indicating that the memory chunk is in a state of being allocated for any data; a cached chunk indicating that the memory chunk was allocated for any data, then deallocated, and is in a holding state before being converted into a free chunk; or a free chunk indicating that the memory chunk is not allocated for any data and is a chunk other than the cached chunk.

The method 1800 may be initiated by the processor deallocating an allocated chunk in the on-chip memory area, which is finished with the use of the memory, and converting the same into a cached chunk, at S1810.

The processor may receive an on-chip memory allocation request for specific data, at S1820. The processor may allocate the specific data to at least some areas of the on-chip memory.

Regarding the allocation process (P), the processor may determine whether there is a cached chunk of one or more cached chunks that is allocable for the specific data, based on a comparison between the size of the specific data and the size of the one or more cached chunks, at S1830. As a result of the determination, if it is determined that there is a cached chunk allocable for the specific data, the processor may allocate the specific data to a specific cached chunk of the one or more cached chunks, at S1840. Conversely, if it is determined that there is no cached chunk allocable for the specific data, the processor may allocate the specific data to at least a portion of the free chunk, at S1850.

As an example of the allocation process (P), the processor may determine whether there is a cached chunk of the one or more cached chunks that has the same size as the size of the specific data. As a result of the determination, if it is determined that the size of the specific cached chunk of the one or more cached chunks is the same as the size of the specific data, the processor may allocate the specific data to the specific cached chunk. Alternatively, if it is determined that there is no cached chunk matching the size of the specific data, the processor may allocate the specific data to at least a portion of the free chunk.

As another example of the allocation process (P), among one or more cached chunks having a predefined range associated with each of them, the processor may determine whether there is a cached chunk that has the predefined range into which the size of the specific data falls. An upper limit of the predefined range associated with each of the one or more cached chunks may be a size of each of the one or more cached chunks, and a lower limit of the predefined range associated with each of the one or more cached chunks may be a predefined ratio (it may be any real number greater than 0 and less than 1) of the size of each of the one or more cached chunks. The predefined ratio may be determined based on a memory format of data input or output to or from the on-chip memory, and a data layout included in the artificial intelligence application executed or compiled by the at least one processor.

As a result of determining, among the one or more cached chunks having the predefined ranges associated with each of them, whether there is a cached chunk that has the predefined range into which the size of the specific data falls, if it is determined that the size of the specific data falls into the predefined range associated with a specific cached chunk, the processor may allocate the specific data to the specific cached chunk. Alternatively, if it is determined that the size of the specific data does not fall into the predefined range associated with each of one or more cached chunks, the processor may allocate the specific data to at least a portion of the free chunk.

The cached chunk may be further subdivided into a plurality of types. For example, the cached chunk may be classified as either a first type cached chunk or a second type cached chunk. The first type cached chunk may be a type of cached chunk such that the data to be allocated is allocated to the cached chunk if the size of the data to be allocated is the same as the size of the data of the cached chunk. In addition, the second type cached chunk may be a type of cached chunk such that the data to be allocated is allocated to the cached chunk if the size of the data to be allocated falls into the predefined range associated with the cached chunk.

If the allocated chunk is deallocated and converted into a cached chunk, whether this chunk will be converted into the first type or the second type may be determined depending on the type of data allocated to the chunk. For example, if the allocated chunk finished with the use of the memory is a chunk allocated for the weight data of the artificial intelligence application, the processor may deallocate the chunk and convert it into a first type cached chunk. Conversely, if the allocated chunk finished with the use of the memory is a chunk allocated for the input data or output data to or from the artificial intelligence application, the processor may deallocate the chunk and convert it into a second type cached chunk.

Additionally or alternatively, the cached chunks may be stratified into a plurality of levels of cached chunks. This will be described in more detail elsewhere with reference to FIG. 19.

The processor may convert the cached chunk into the free chunk under certain conditions. For example, the processor may convert a cached chunk of one or more cached chunks into a free chunk, if a number of times that the cached chunk is not allocated with any data as a result of size comparison with the data is equal to or greater than a first predefined number of times. Additionally or alternatively, if there is no cached chunk allocable for the specific data subject to on-chip memory allocation, and if there is no free chunk allocable for the specific data, the processor may convert at least a portion of the cached chunk into free chunk.

Figure 19:
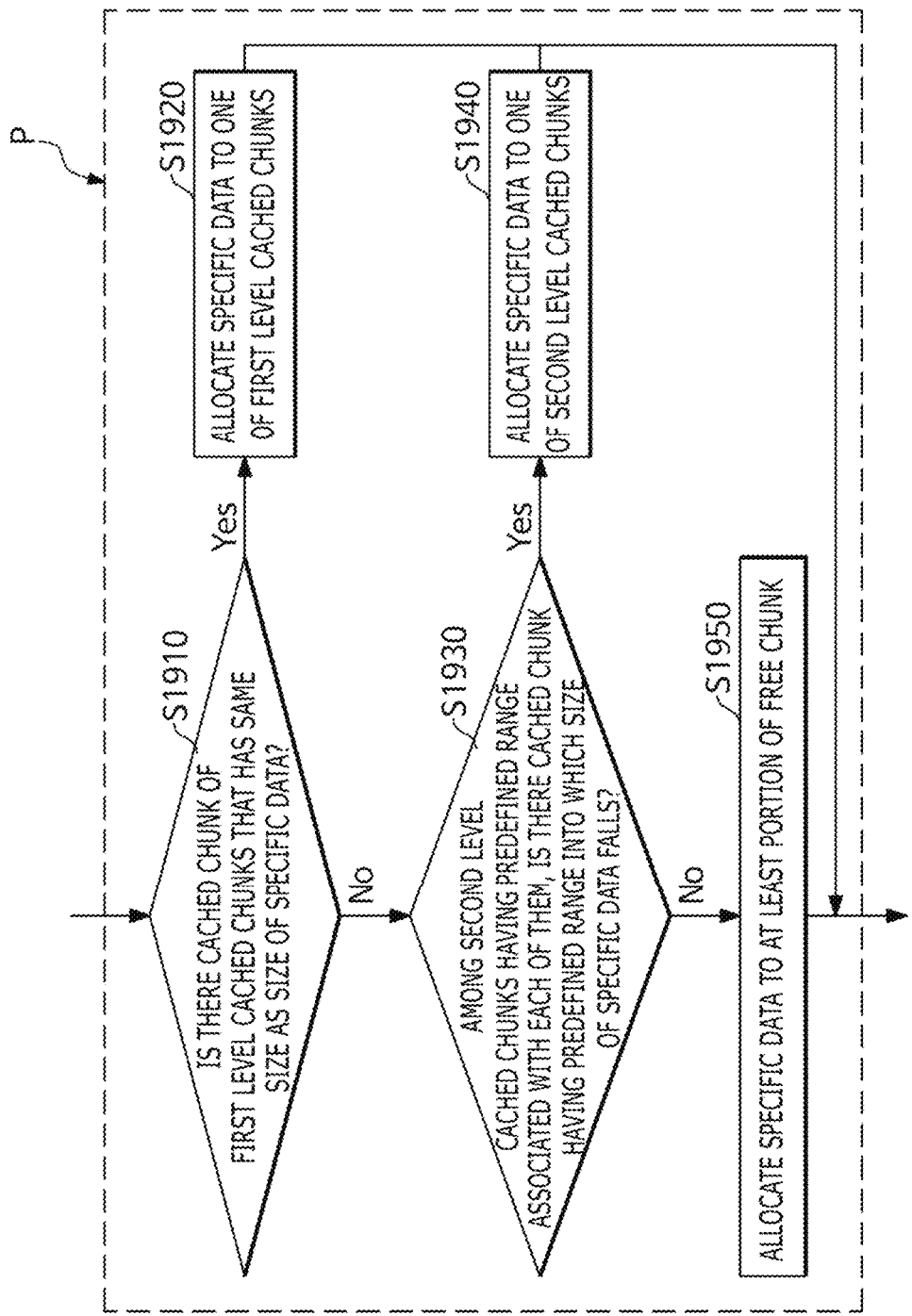
FIG. 19 is a flowchart illustrating an example of an allocation process.

FIG. 19 is a flowchart illustrating an example of the allocation process (P). The cached chunk may be stratified into a plurality of levels of cached chunks. For example, the cached chunk may be classified as either a first level cached chunk or a second level cached chunk. The first level cached chunk may be a type of cached chunk such that data to be allocated is allocated to the cached chunk if the size of the data to be allocated is the same as the size of the data of the cached chunk. In addition, the second level cached chunk may be a type of cached chunk such that the data to be allocated is allocated to the cached chunk if the size of the data to be allocated falls into the predefined range associated with the cached chunk.

In order to allocate the on-chip memory for specific data, the processor may determine whether there is an allocable chunk among the first level cached chunks, and if there is no first level cached chunk that is allocable, may sequentially determine whether there is an allocable chunk in the second level cached chunks. For example, the process of allocating the on-chip memory for the specific data may be performed as follows.

First, the processor may determine whether there is a cached chunk of the first level cached chunks that has the same size as the size of the specific data, at S1910. As a result of the determination at S1910, if it is determined that there is no cached chunk of the first level cached chunks which has the same size as the size of specific data, the processor may allocate the specific data to a specific first level cached chunk having the same size as the specific data, at S1920. On the other hand, if it is determined that there is no cached chunk of the first level cached chunks that has the same size as the size of the specific data, the processor may determine, among the second level cached chunks having a predefined range associated with each of them, whether there is a cached chunk that has the predefined range into which the size of the specific data falls, at S1930.

As a result of the determination at S1930, if it is determined that, among the second level cached chunks having a predefined range associated with each of them, the size of the specific data falls into the predefined range of a specific second level cached chunk, the processor may allocate the specific data to the specific second level cached chunk, at S1940. Conversely, among the second level cached chunks having the predefined range associated with each of them, if it is determined that there is no cached chunk having the predefined range to which the specific data falls into, the processor may allocate the specific data to at least a portion of the free chunk, at S1950.

After comparing the sizes a certain number of times, the processor may then convert the level of the unallocated cached chunk into a lower level. For example, the processor may convert a cached chunk of the first level cached chunks into a second level cached chunk, if a number of times that the cached chunk is not allocated with any data as a result of size comparison with the data is equal to or greater than a second predefined number of times. In addition, the processor may convert a cached chunk of the second level cached chunks into a free chunk, if a number of times that the cached chunk is not allocated with any data as a result of size comparison with the data is equal to or greater than a third predefined number of times.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for allocating on-chip memory of a neural processing unit, the method being performed by one or more processors and comprising:
   in an on-chip memory area including a plurality of chunks classified as one of an allocated chunk, a cached chunk, or a free chunk, deallocating an allocated chunk finished with use of the memory and converting the deallocated chunk into the cached chunk;
   receiving an on-chip memory allocation request for specific data;
   determining, based on a comparison between a size of the specific data and a size of one or more cached chunks, whether there is a cached chunk of the one or more cached chunks that is allocable for the specific data; and
   based on a result of determining whether there is the cached chunk that is allocable for the specific data, allocating the specific data to a specific cached chunk of the one or more cached chunks, or allocating the specific data to at least a portion of a classified free chunk,
   wherein the one or more cached chunks include a first type cached chunk and a second type cached chunk, and
   the first type cached chunk is a type of cached chunk such that the data to be allocated is allocated to the cached chunk if the size of the data to be allocated is the same size of a previously stored data of the cached chunk, and
   the second type cached chunk is a type of cached chunk such that the data to be allocated is allocated to the cached chunk if the size of the data to be allocated falls into a predefined range associated with the cached chunk less than the size of the cached chunk, and
   the converting the deallocated chunk into the cached chunk includes converting, based on a type of data to which the allocated chunk finished with use of the memory was allocated, the deallocated chunk into the first type cached chunk or the second type cached chunk.

2. The method according to claim 1, wherein the determining includes determining whether there is a cached chunk, which has the same size as the size of the specific data, of the one or more cached chunks,
   wherein the allocating includes:
   allocating, based on determining that a size of the specific cached chunk of the one or more cached chunks is the same as the size of the specific data, the specific data to the specific cached chunk; or allocating, based on determining that there is no cached chunk matching the size of the specific data, the specific data to at least a portion of the free chunk.

3. The method according to claim 1, wherein the determining includes determining, among the one or more cached chunks having a predefined range associated with each of the one or more cached chunks, whether there is a cached chunk that has the predefined range into which the size of the specific data falls, and the allocating includes:

allocating, based on determining that the size of the specific data falls into the predefined range associated with a specific cached chunk, the specific data to the specific cached chunk; or allocating, based on determining that the size of the specific data does not fall into the predefined range associated with each of the one or more cached chunks, the specific data to at least a portion of the free chunk.

4. The method according to claim 3, wherein an upper limit of the predefined range associated with each of the one or more cached chunks is a size of each of the one or more cached chunks, and a lower limit of the predefined range associated with each of the one or more cached chunks is a value of multiplying the size of each of the one or more cached chunks by a predefined ratio, and the predefined ratio is a real number greater than 0 and less than 1.

5. The method according to claim 4, wherein the predefined ratio is determined based on a memory format of data input or output to or from the on-chip memory, and a data layout of an artificial intelligence application executed or compiled by the one or more processors.

6. The method according to claim 1, further comprising converting a specific cached chunk of the one or more cached chunks into a free chunk, if a number of times that the specific cached chunk is not allocated with any data as a result of size comparison with the data is equal to or greater than a first predefined number of times.

7. The method according to claim 1, wherein the allocating includes, if there is no cached chunk allocable for the specific data and if there is no free chunk allocable for the specific data, converting at least a portion of the cached chunks into a free chunk.

8. The method according to claim 1, wherein the method is performed while the one or more processors are executing or compiling an artificial intelligence application, and the converting into the cached chunk further includes:

if the allocated chunk finished with the use of the memory is a chunk allocated for weight data of the artificial intelligence application, deallocating the allocated chunk finished with the use of the memory and converting the deallocated chunk into the first type cached chunk; or if the allocated chunk finished with the use of the memory is a chunk allocated for input data or output data to or from the artificial intelligence application, deallocating the allocated chunk finished with the use of the memory and converting the deallocated chunk into the second type cached chunk.

9. The method according to claim 1, wherein the one or more cached chunks include a first level cached chunk and a second level cached chunk, and the determining includes:

determining whether there is a cached chunk, which has the same size as the size of the specific data, of the first level cached chunks; and determining, based on determining that there is no cached chunk, which has the same size as the size of the specific data, of the first level cached chunks, among the second level cached chunks having a predefined range associated with each of the second level cashed chunks, whether there is a cached chunk that has the predefined range into which the size of the specific data falls.

10. The method according to claim 9, further comprising:

converting a cached chunk of the first level cached chunks into a second level cached chunk, if a number of times that the cached chunk is not allocated with any data as a result of size comparison with the data is equal to or greater than a second predefined number of times; and converting a cached chunk of the second level cached chunks into a free chunk, if a number of times that the cached chunk is not allocated with any data as a result of size comparison with the data is equal to or greater than a third predefined number of times.

11. A neural processing system comprising:

a neural processing unit that executes neural network calculations for an artificial intelligence application;

an on-chip memory that is located on the same chip as the neural processing unit; and one or more processors that manage memory allocation of the on-chip memory, wherein the on-chip memory includes a plurality of chunks, and each of the plurality of chunks of the on-chip memory is classified as one of:

an allocated chunk indicating that the chunk is in a state of being allocated for any data;

a cached chunk indicating that the chunk was allocated for any data, then deallocated, and is in a holding state before being converted into a free chunk; or a free chunk indicating that the chunk is not allocated for any data and is a chunk other than the cached chunk, and the one or more cached chunks include a first type cached chunk and a second type cached chunk, and the first type cached chunk is a type of cached chunk such that the data to be allocated is allocated to the cached chunk if the size of the data to be allocated is the same size of a previously stored data of the cached chunk, and the second type cached chunk is a type of cached chunk such that the data to be allocated is allocated to the cached chunk if the size of the data to be allocated falls into a predefined range associated with the cached chunk less than the size of the cached chunk, and the one or more processors deallocate an allocated chunk finished with use of the memory and convert, based on a type of data to which the allocated chunk finished with use of the memory was allocated, the deallocated chunk into the first type cached chunk or the second type cached chunk.

12. The neural processing system according to claim 11, wherein the one or more processors receive an on-chip memory allocation request for specific data, determine, based on a comparison between a size of the specific data and one or more cached chunks, whether there is a cached chunk, which is allocable for the specific data, of the one or more cached chunks, and according to the determination result, allocate the specific data to a specific cached chunk of the one or more cached chunks, or allocate the specific data to at least a portion of the free chunk.

13. The neural processing system according to claim 12, wherein the one or more processors determine whether there is a cached chunk, which has the same size as the size of the specific data, of the one or more cached chunks, and allocate, based on determining that a size of the specific cached chunk of the one or more cached chunks is the same as the size of the specific data, the specific data to the specific cached chunk, or allocate, based on determining that there is no cached chunk matching the size of the specific data, the specific data to at least a portion of the free chunk.

14. The neural processing system according to claim 12, wherein the one or more processors determine, among the one or more cached chunks having a predefined range associated with each of the one or more cached chunks, whether there is a cached chunk that has the predefined range into which the size of the specific data falls, and allocate, based on determining that the size of the specific data falls into the predefined range associated with a specific cached chunk, the specific data to the specific cached chunk; or allocate, based on determining that the size of the specific data does not fall into the predefined range associated with each of the one or more cached chunks, the specific data to at least a portion of the free chunk.

15. The neural processing system according to claim 12, wherein the one or more processors if an allocated chunk of the allocated chunks that is finished with the use of the memory is a chunk allocated for weight data of the artificial intelligence application, deallocate the allocated chunk finished with the use of the memory and convert the deallocated chunk into the first type cached chunk, or if the allocated chunk finished with the use of the memory is a chunk allocated for input data or output data to or from the artificial intelligence application, deallocate the allocated chunk finished with the use of the memory and convert the deallocated chunk into the second type cached chunk.

16. The neural processing system according to claim 12, wherein the cached chunks include a first level cached chunk and a second level cached chunk, and the one or more processors determine whether there is a cached chunk, which has the same size as the size of the specific data, of the first level cached chunks; and determine, based on determining that there is no cached chunk of the first level cached chunks that has the same size as the size of the specific data, among the second level cached chunks having a predefined range associated with each of the second level cashed chunks, whether there is a cached chunk that has the predefined range into which the size of the specific data falls.

17. The neural processing system according to claim 16, wherein the one or more processors convert a cached chunk of the first level cached chunks into a second level cached chunk, if a number of times that the cached chunk is not allocated with any data as a result of size comparison with the data is equal to or greater than a second predefined number of times, and convert a cached chunk of the second level cached chunks into a free chunk, if a number of times that the cached chunk is not allocated with any data as a result of size comparison with the data is equal to or greater than a third predefined number of times.

* * * * *